(12) United States Patent
Robles et al.

(10) Patent No.: US 6,282,172 B1
(45) Date of Patent: *Aug. 28, 2001

(54) GENERATING ACKNOWLEDGEMENT SIGNALS IN A DATA COMMUNICATION SYSTEM

(75) Inventors: Frank R. Robles, San Jose; Peter Kaminski, Portola Valley, both of CA (US)

(73) Assignee: Yipes Communications, Inc., San Francisco, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/825,682

(22) Filed: Apr. 1, 1997

(51) Int. Cl.[7] ........................................ H04J 1/16
(52) U.S. Cl. .............................. 370/230; 370/428
(58) Field of Search ................... 370/230, 232, 370/233, 234, 235, 236, 237, 231, 428

(56) References Cited

U.S. PATENT DOCUMENTS

| | | |
|---|---|---|
| 5,008,879 | 4/1991 | Fischer et al. . |
| 5,050,161 * | 9/1991 | Golestani .................... 370/230 |
| 5,309,437 | 5/1994 | Perlman et al. . |
| 5,432,784 | 7/1995 | Özveren . |
| 5,442,637 | 8/1995 | Nguyen . |
| 5,473,599 | 12/1995 | Li et al. . |
| 5,490,252 | 2/1996 | Macera et al. . |
| 5,519,699 * | 5/1996 | Ohsawa . |
| 5,519,704 | 5/1996 | Farinacci et al. . |
| 5,519,707 | 5/1996 | Subramanian et al. . |
| 5,541,987 | 7/1996 | Topper et al. . |
| 5,550,579 | 8/1996 | Martinez . |
| 5,553,061 | 9/1996 | Waggener, Jr. et al. . |
| 5,553,241 | 9/1996 | Shirakihara . |
| 5,555,266 | 9/1996 | Buchholz et al. . |
| 5,557,604 | 9/1996 | Usumi et al. . |
| 5,559,796 | 9/1996 | Edem et al. . |
| 5,560,038 | 9/1996 | Haddock . |
| 5,563,884 | 10/1996 | Fimoff et al. . |
| 5,650,993 * | 7/1997 | Lakshman et al. ................. 370/236 |
| 5,793,768 * | 8/1998 | Keshav ................................ 370/400 |

OTHER PUBLICATIONS

Los Angeles Times, "Net Transmission Standard Not Suited for Space, NASA Finds", Oct. 4, 1996.

James Stepanek and Stephen Schwab, VIPRE—Virtual Internet Packet Relay—An Encapsulation Architecture for Unidirectional Links, Internet Draft, Feb. 1997.

* cited by examiner

Primary Examiner—Joe H. Cheng
Assistant Examiner—Kim T. Nguyen
(74) Attorney, Agent, or Firm—Blakely, Sokoloff, Taylor & Zafman LLP

(57) ABSTRACT

A system for controlling the flow of data receives a data packet from a source node for transmission across a communication medium to a destination node. The system generates an acknowledgment signal indicating receipt of the data packet at the destination node. The acknowledgment signal is generated before completing transmission of the data packet to the destination node. The system then transmits the acknowledgment signal to the source node, regardless of whether transmission of the data packet to the destination node is complete. Generation of the acknowledgment signal is performed by a device other than the destination node. The system buffers the received data packet until an actual acknowledgment signal is received from the destination node. When the actual acknowledgment signal is received, the buffered data packet is deleted from the buffer.

38 Claims, 21 Drawing Sheets

*FIG. 16A*
*FIG. 16B*
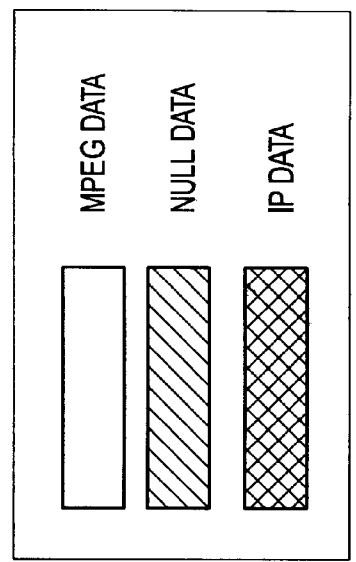

GENERATING ACKNOWLEDGEMENT SIGNALS IN A DATA COMMUNICATION SYSTEM

FIELD OF THE INVENTION

The present invention relates to the field of data communication systems. In particular, the present invention relates to a system for generating acknowledgment signals in a data communication system.

BACKGROUND OF THE INVENTION

Various types of systems are utilized to transmit information between a source and a destination. Existing systems use wire-based or cable-based communication links to transmit information between various sources and destinations. These communication links may become problematic when extended over long distances. For example, the use of cable-based communication links may not be feasible between different continents or other geographic areas not easily serviced by cable-based communication links.

In many situations, the costs associated with installing cable-based communication links is prohibitive. For example, in remote areas without any type of existing communication system, it may be too expensive to install cable-based communication links. If additional transmission capacity is needed on existing cable-based communication links, it may be too expensive to install additional cables across oceans, mountains, and other geographic obstacles. Additionally, in locations requiring communication links on a temporary basis, it may not be feasible to install cable-based communication links for the temporary requirements.

Thus, wirebased or cable-based communication links encounter problems with a variety of obstacles, including land rights, river crossings, mountainous terrain, lakes, and oceans. Even without geographic obstacles, remote areas or areas separated by a significant distance may not be serviced economically using wire-based or cable-based communication links. Therefore, solutions must be developed to overcome these obstacles and permit communication links having the necessary bandwidth for communicating data between two locations.

Satellite transmission systems and other wireless systems provide communication links that do not require the installation of wires or cables across geographic obstacles. However, satellite communication links have a high latency due to the significant distances over which the data is transmitted. This high latency may cause problems with the flow of data using certain transmission protocols. For example, the flow of Internet Protocol (IP) data is reduced by the source if the source detects significant delays in receiving acknowledgments from the destination. Typically, a significant delay in receiving acknowledgments indicates congestion on the communication link. Therefore, using a high-latency satellite communication link to transmit IP data is likely to cause the data source to reduce the flow of data, even if the communication link is not congested.

Additionally, asymmetrical communication links may cause problems with the transmission of certain types of data. An asymmetrical communication link has a different latency in each direction (e.g., high-latency communication in one direction and low latency communication in the opposite direction). Alternatively, an asymmetrical communication link may have different bandwidths or different communication rates in opposite directions. This asymmetry can cause problems with the flow of data using certain transmission protocols. For example, a source of Internet Protocol (IP) data reduces the outgoing flow of IP data if the source detects significant delays in receiving acknowledgments from the destination. Variations in delays in receiving acknowledgments over a low bandwidth incoming link could cause the source to reduce the flow of data over the outgoing link, even though the outgoing link has adequate capacity to handle the data flow.

Problems may also occur in transmission systems that have high-bandwidth communication links. On high-bandwidth communication links, if a large amount of data is sent and the sequence numbers (or other data identifiers) are repeated, a delayed acknowledgment of a previously sent message may be identified as a new data message. For example, the Internet Protocol uses sequence numbers in each packet which identify the packet's position in the overall data stream. The sequence numbers are incremented to a fixed limit, and then start again at zero. If the sequence numbers are used up quickly, as is possible in a very high bandwidth link, it is possible that duplicate sequence numbers are active within the link at the same time. At the receiving end, when the data streams are reassembled, the packets with duplicate sequence numbers may be assigned to the wrong data stream.

It is therefore desirable to provide a system for generating acknowledgment signals in a manner that permits the efficient transmission of data across high-latency communication links and asymmetrical communication links, as well as high-bandwidth communication links.

SUMMARY OF THE INVENTION

The present invention provides a mechanism for transmitting data between communication devices. Various embodiments of the invention may be used to transmit data across high latency communication links, asymmetrical communication links, and other communication links that typically provide obstacles for transmitting data such as Internet Protocol (IP) data. Additionally, embodiments of the invention avoid problems that occur on high-bandwidth communication links when a large amount of data is sent, creating the possibility that the data identifiers will be repeated. Specific embodiments of the invention provide mechanisms for generating an acknowledgment signal that causes the data source to believe that data has been received by the destination. These acknowledgment signals may actually be generated prior to receipt of the data at the destination. These early acknowledgment signals prevent the data source from reducing its data rate due to the high latency or asymmetry of the communication link.

An embodiment of the invention receives a data packet from a source node for transmission across a communication medium to a destination node. The system generates an acknowledgment signal indicating receipt of the data packet at the destination node. The acknowledgment signal is generated before completing transmission of the data packet to the destination node. The system then transmits the acknowledgment signal to the source node.

Another embodiment of the invention buffers the received data packet until an actual acknowledgment signal is received from the destination node. When the actual acknowledgment signal is received, the buffered data packet is deleted from the buffer.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIGS. 16A and 16B illustrate example MPEG video data streams.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

For purposes of explanation, various embodiments of the invention will be illustrated with reference to the Transmission Control Protocol/Internet Protocol (TCP/IP) protocol. However, those of ordinary skill in the art will appreciate that the teachings of the present invention may also be utilized with other transmission protocols. Furthermore, various embodiments of the invention will be described, for example, as using a network switching device. However, it will be appreciated that the present invention may be used with any type of communication device, including switches, routers, servers, embedded controllers, computing devices executing routing or switching algorithms, and other network communication devices.

Embodiments of the present invention provide a mechanism for transmitting data between communication devices. Various embodiments of the invention may be used to transmit data across high latency communication links, asymmetrical communication links, and other communication links that typically provide obstacles for transmitting data such as Internet Protocol (IP) data. Additionally, embodiments of the invention avoid problems that occur on high-bandwidth communication links when a large amount of data is sent, creating the possibility that the data identifiers will be repeated. Specific embodiments of the invention provide mechanisms for generating an acknowledgment signal that causes the data source to believe that data has been received by the destination. These acknowledgment signals may actually be generated prior to receipt of the data at the destination. These early acknowledgment signals prevent the data source from reducing its data rate due to the high latency or asymmetry of the communication link. Additionally, these early acknowledgment signals avoid the problems caused by repeated identifiers on high-bandwidth communication links.

Figure 1:
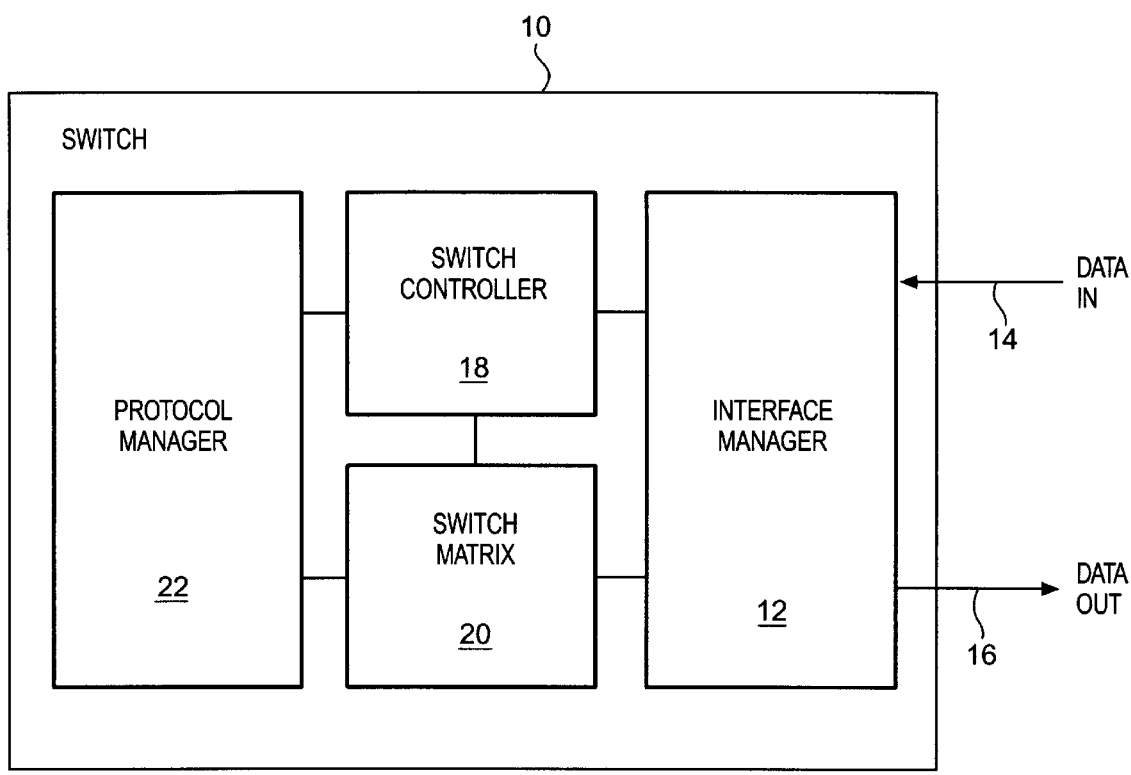
FIG. 1 illustrates an embodiment of a switch capable of implementing the teachings of the present invention.

FIG. 1 illustrates an embodiment of a switch 10 capable of implementing the teachings of the present invention. Switch 10 may be any type of data switching device, such as an IP switch or an Asynchronous Transfer Mode (ATM) switch. Switch 10 may handle various types of data, including IP data. Switch 10 includes an interface manager 12 capable of controlling interface circuits that receive data on one or more communication links 14 and transmit data on one or more communication links 16. The various communication links 14 and 16 may be coupled to switches, networks, computers, or other devices capable of transmitting or receiving data.

A switch controller 18 is coupled to interface manager 12 and controls the overall operation of switch 10. In particular, switch controller 18 determines when to establish a particular data flow and establishes the data flow in a switch matrix 20. Switch matrix 20 is coupled to switch controller 18 and interface manager 12, and provides various switching functions for handling the flow of data through switch 10. A protocol manager 22 is coupled to switch controller 18 and switch matrix 20. Protocol manager 22 provides the processing and control functions necessary to implement one or more data transmission protocols, based on the configuration of switch 10. In a particular embodiment of switch 10, switch matrix 20 performs Internet Protocol (IP) switching, and protocol manager 22 performs Transmission Control Protocol (TCP) management functions.

Figure 2:
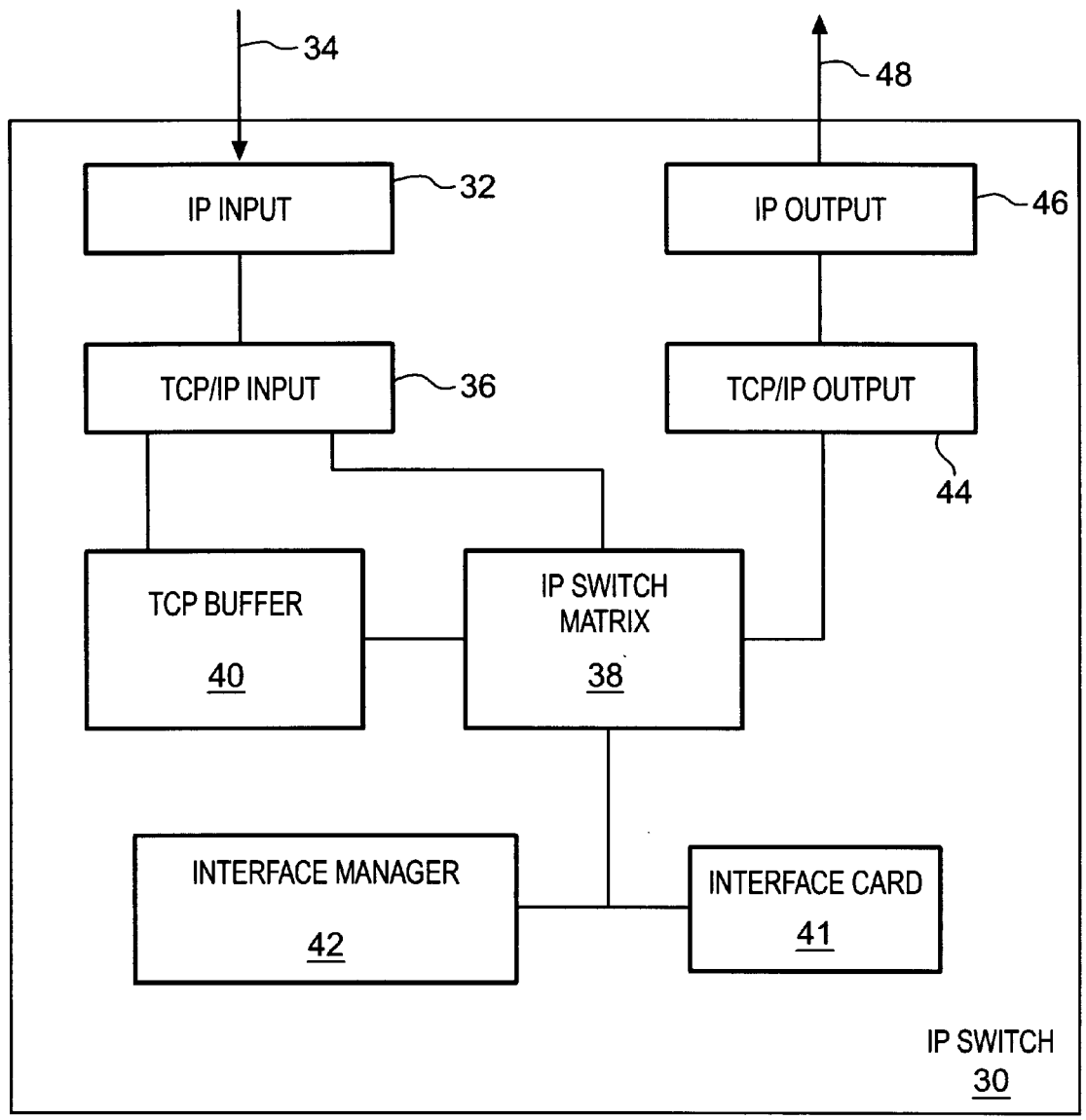
FIG. 2 illustrates a block diagram of an embodiment of an Internet Protocol (IP) switch.

FIG. 2 illustrates a block diagram of an embodiment of an IP switch 30. Various interconnections are shown between the components or modules of switch 30. These interconnections are for purposes of explanation, and do not represent all possible connections within a particular switch 30. IP switch 30 includes an IP input module 32 coupled to receive data on a communication link 34. A TCP/IP input module 36 is coupled to receive data from IP input module 32. IP switch matrix 38 is coupled to receive data from TCP/IP input module 36 and a TCP buffer 40. TCP buffer 40 provides a temporary storage mechanism for data received by TCP/IP input module 36 and awaiting transmission by IP switch matrix 38 or awaiting receipt of an acknowledgment signal from the destination associated with the stored data.

An interface manager 42 is coupled to IP switch matrix 38 and one or more interface cards 41. Interface manager 42 controls the flow of data through the inputs and outputs of IP switch 30. Various types of interface cards 41 may be provided in IP switch 30, such as cards to support Frame Relay, ATM, MPEG (Motion Picture Expert Group), Ethernet, and other interfaces. A TCP/IP output module 44 is coupled to IP switch matrix 38 and generates the various data packets to be transmitted by IP switch 30. An IP output module 46 is coupled to TCP/IP output module 44 and transmits data packets received from TCP/IP output module 44 across communication link 48. Various other components or modules may be included in particular embodiments of switch 30.

Figure 3A:
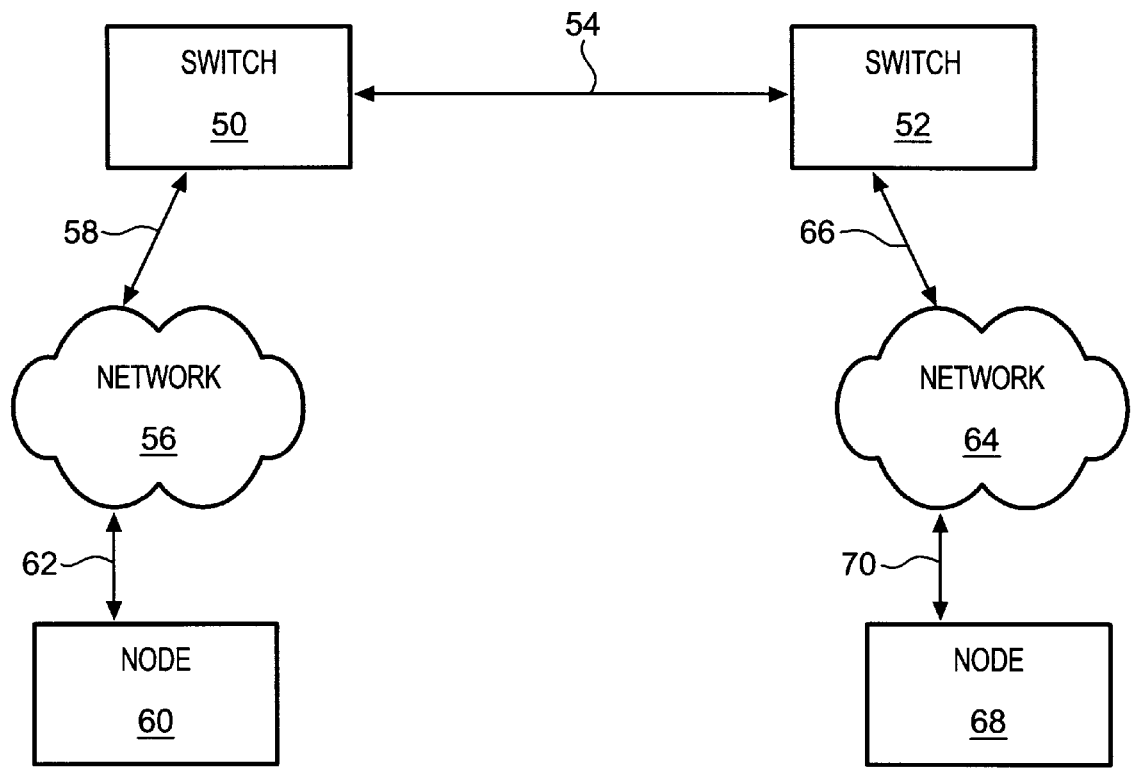
FIGS. 3A and 3B illustrate example configurations of switches used to couple a pair of networks.

FIG. 3A illustrates an example configuration of a pair of switches 50 and 52 used to communicate data between networks 56 and 64. Switches 50 and 52 are coupled together using a communication link 54. In the configuration of FIG. 3A, communication link 54 is illustrated as a bidirectional communication link. Alternatively, switches 50 and 52 may be coupled together using two separate unidirectional communication links. Communication link 54 may utilize any type of communication medium to transmit data between switches 50 and 52. These communication mediums include any type of wire or cable (including fiber optic cable), radio-frequency transmissions, microwave transmissions, and satellite transmissions.

Switch 50 is coupled to network 56 through a communication link 58. Network 56 can be any type of network capable of transmitting data and other information between various nodes and devices coupled to the network. Node 60 represents an example node or network device capable of communicating with network 56 using a communication medium 62. Node 60 may be a workstation, server, or other network device. Although a single node 60 is shown coupled to network 56, those of ordinary skill in the art will appreciate that any number of nodes and other network devices may be coupled to network 56. Furthermore, multiple networks of various types and configurations may be coupled to switch 50.

Switch 52 is coupled to network 64 through a communication link 66. Network 64 may be a network similar to network 56, or may have a different topology or use a different network protocol. Node 68 is coupled to network 64 through a communication link 70. As discussed above with respect to node 60, node 68 may be a workstation, server, or other device capable of communicating with network 64. Additionally, multiple nodes and devices may be coupled to network 64.

Using the configuration shown in FIG. 3A, switches 50 and 52 are capable of transmitting data between networks 56 and 64, thereby allowing nodes and devices coupled to network 56 to communicate with nodes and devices coupled to network 64. For example, if node 60 has data for transmission to node 68, the data is passed through network 56 to switch 50. Switch 50 then determines which of its interfaces should be used to transmit the data to node 68. In this example, switch 50 transmits the data over the interface coupled to communication link 54. The data is received from communication link 54 by switch 52, and is transmitted through network 64 to node 68. Additional information regarding the specific data handling procedures utilized by switches 50 and 52 is provided below.

Figure 3B:
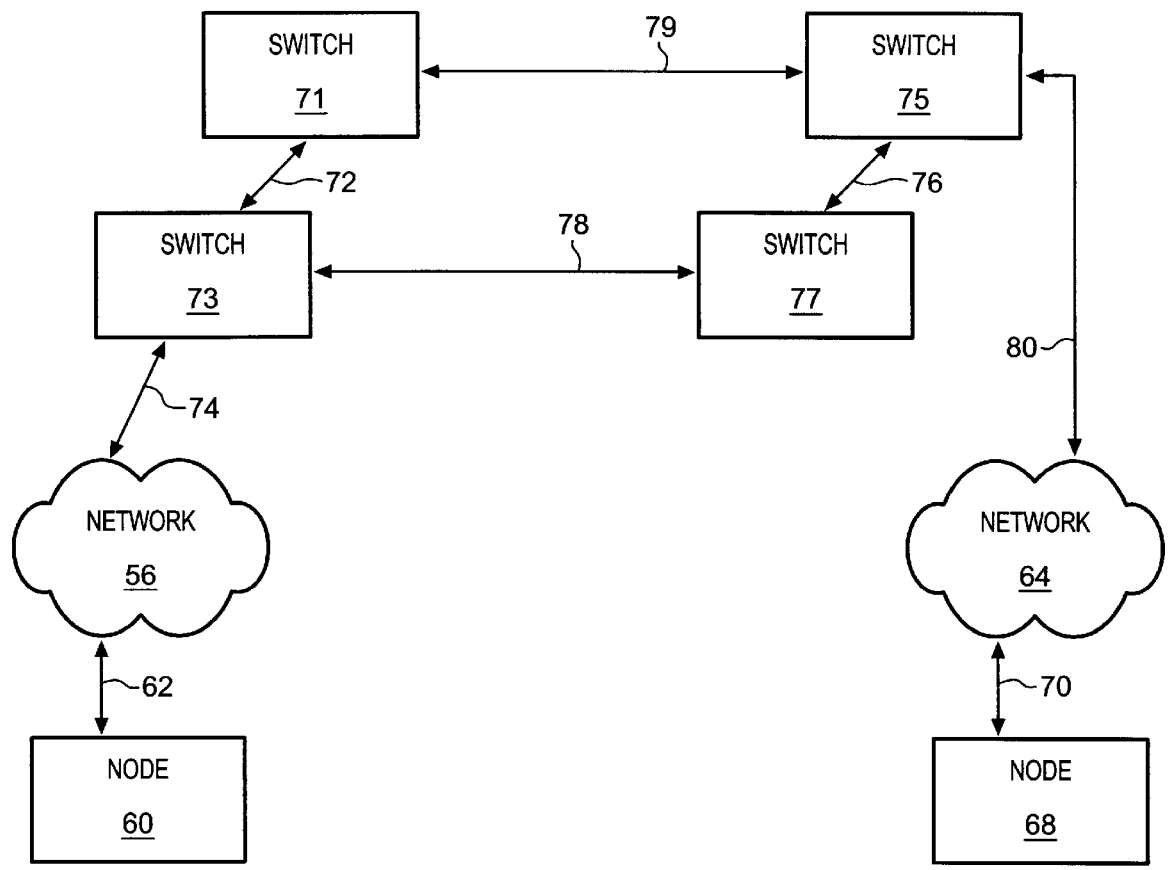

FIG. 3B illustrates another example configuration utilizing multiple switches to provide communication between networks 56 and 64. In this configuration, four switches 71, 73, 75, and 77 are coupled to one another using communication links 72, 76, 78, and 79. The configuration of FIG. 3B distributes the flow of data through multiple switches to reduce congestion caused by bottlenecks (i.e., large amounts of data flowing through a single switch or across a single communication link). Additionally, each switch can be located in a separate physical location.

In the configuration of FIG. 3B, switches 71, 73, 75, and 77 can be coupled to unidirectional communication links 78 and 79 such that switches 73 and 75 are outbound switches and switches 71 and 77 are inbound switches. The outbound and inbound switches are identified by the unidirectional communication links 78 and 79. In this configuration, communication links 72 and 76 are bidirectional communication links. In a particular embodiment, communication links 78 and 79 are satellite communication links. In this embodiment, switches 73 and 75 are satellite uplink switches and switches 71 and 77 are satellite downlink switches.

The configuration of FIG. 3B allows the use of a single outgoing switch that receives data from multiple receiving switches coupled to a common network, such as a local city network. The multiple receiving switches can be located at various office sites, homes, schools, and other locations throughout a geographic area (such as a city). The multiple receiving switches transmit data to one or more outgoing switches coupled to the communication medium (e.g., communication medium 78 or 79).

An exemplary local city network can include multiple outgoing switches, each coupled to transmit data from the local city network to another network (e.g., using one or more satellite communication links).

In a system using the configuration of FIG. 3B, if node 60 has data for transmission to node 68, then the data is passed through network 56 to switch 73. Switch 73 then determines which of its interfaces should be used to transmit the data to node 68. Since switch 73 is an outgoing switch, the data can be communicated across communication link 78 to switch 77. In this example, switch 77 is not coupled directly to network 64. Therefore, switch 77 first transmits the data to switch 75, which then transmits the data through network 64 to node 68.

In the configuration of FIG. 3B, data can be transmitted from node 68 to node 60 by transmitting the data through network 64 to switch 75. Since switch 75 is an outgoing switch, the data is transmitted across communication link 79 to switch 71. Switch 71 then transmits the received data to switch 73 using communication link 72, and switch 73 transmits the data through network 56 to node 60.

FIG. 3B represents one exemplary configuration of multiple switches capable of being positioned in separate physical locations. However, those of ordinary skill in the art will appreciate that various other configurations of switches, networks, and communication links may utilize the teachings of the present invention.

Figure 4:
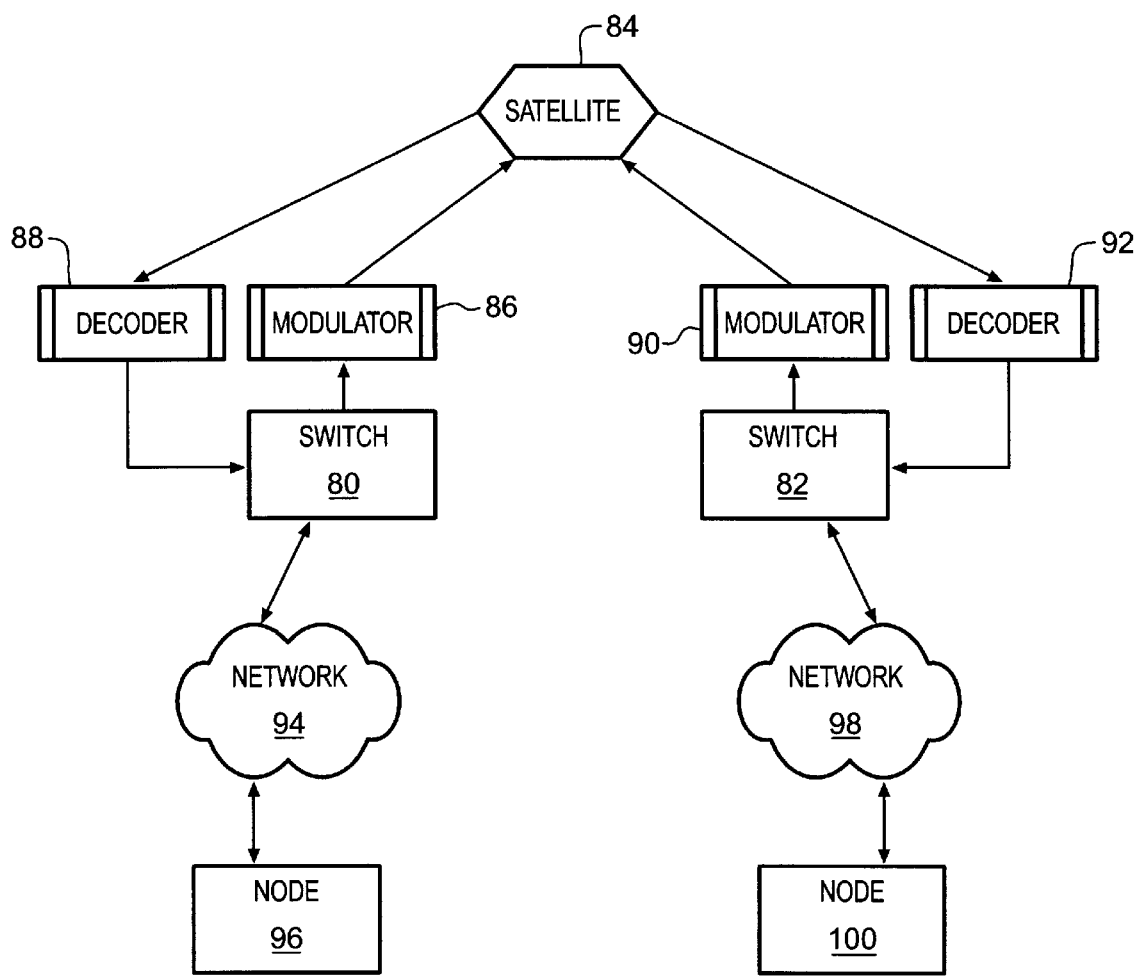
FIG. 4 illustrates an example communication system using a satellite to transmit data between a pair of switches.

FIG. 4 illustrates an example communication system using a satellite 84 to transmit data between a pair of switches 80 and 82. A satellite communication link is an example of a high-latency communication link. The high latency is caused by the significant distances that a signal must travel to and from the satellite. Switch 80 is coupled to a modulator 86 and a decoder 88. Modulator 86 modulates data signals received from switch 80 and transmits the modulated signals to satellite 84. Incoming signals from satellite 84 are received by decoder 88, which decodes (or demodulates) the incoming signals and generates data signals that are provided to switch 80.

In a similar configuration, a modulator 90 and a decoder 92 are coupled to switch 82. Modulator 90 modulates data signals received from switch 82 and transmits the modulated signals to satellite 84. Decoder 92 receives modulated signals from satellite 84 and decodes (or demodulates) the incoming signals to generate data signals. The data signals are then provided to switch 82.

Switch 80 and a node 96 are coupled to communicate with a network 94 in a manner similar to that described above with respect to FIGS. 3A and 3B. Similarly, switch 82 and a node 100 are coupled to communicate with a network 98 in a manner similar to that described above with respect to FIGS. 3A and 3B.

In the configuration of FIG. 4, node 96 can transmit data to node 100 by transmitting the data through network 94 to switch 80. Switch 80 sends the data to modulator 86, which modulates the data and transmits a modulated signal to satellite 84. Satellite 84 receives the modulated signal and re-transmits the signal to decoder 92. Decoder 92 decodes the received signal and provides a decoded data signal to switch 82. Switch 82 then transmits the data signal across network 98 to node 100. By utilizing a satellite communication link, signals can be received in areas that do not otherwise have communication services (e.g., areas not served by telephone lines or other data communication links) due to geographic obstacles such as oceans or mountainous terrain. Additionally, satellite communication links can provide a high-bandwidth supplement to existing low-bandwidth communication links.

As discussed above, a satellite communication link is an example of a high-latency communication link. However, high latency can also occur in other systems if a signal must travel a significant distance or if the communication link is congested, thereby increasing the time required to transmit the data.

Figure 5:
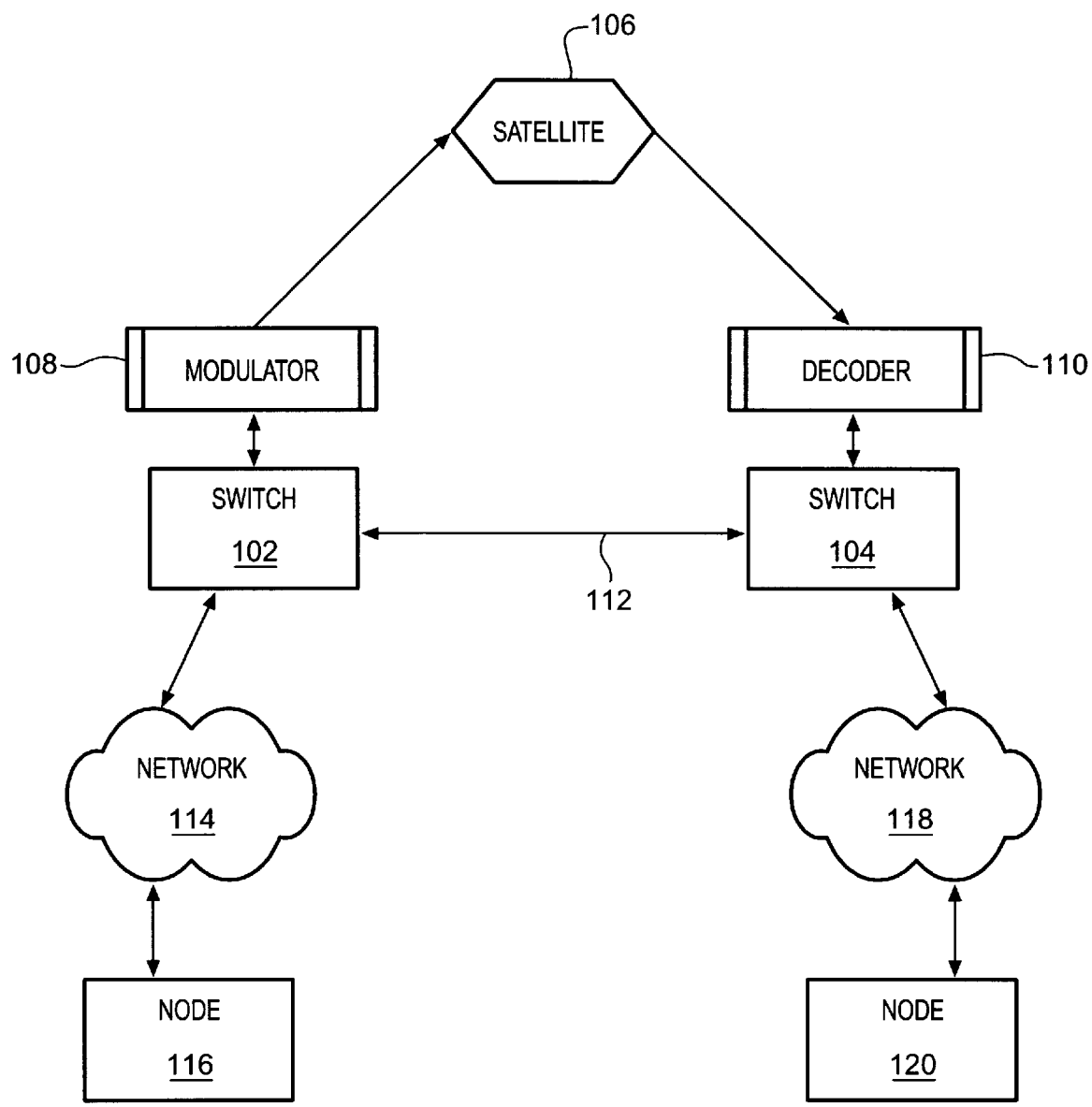
FIGS. 5 and 6 illustrate other example configurations using a satellite to transmit data between a pair of switches.

FIG. 5 illustrates another example configuration using a satellite 106 to transmit data between a pair of switches 102 and 104. In this configuration, a unidirectional satellite communication link is utilized, such that data transmitted from switch 102 to switch 104 is transmitted using satellite 106. However, data is transmitted from switch 104 to switch 102 using a different communication link 112. Thus, the configuration of FIG. 5 represents an asymmetrical link (i.e., a high-bandwidth, high-latency satellite communication link in one direction and a lower bandwidth, low-latency communication link 112 in the opposite direction).

Data transmission from switch 102 to switch 104 is accomplished by transmitting the data from switch 102 to a modulator 108. Modulator 108 modulates the data and transmits the modulated signal to satellite 106. Satellite 106 re-transmits the modulated signal to a decoder 110. Decoder 110 decodes the signal and transmits a decoded data signal to switch 104.

In FIG. 5, communication link 112 is shown as a bidirectional communication link, but may also be a unidirectional communication link from switch 104 to switch 102. If link 112 is bidirectional, data transmitted from switch 102 to switch 104 may utilize either the satellite communication link or communication link 112. However, data transmitted from switch 104 to switch 102 must use communication link 112, because the satellite communication link is unidirectional. Switch 102 is coupled to a network 114, which is coupled to a node 116. Similarly, switch 104 is coupled to a network 118, which is coupled to a node 120.

The unidirectional satellite communication link shown in FIG. 5 is less expensive than the bidirectional satellite communication link shown in FIG. 4 because it requires a single modulator and a single decoder. The configuration of FIG. 5 is particularly useful in situations where a significant portion of the data is transmitted in one direction. For example, if node 120 regularly requests significant amounts of data from nodes coupled to network 114, then communication link 112 is used to transmit the relatively small requests for data, and the satellite communication link is used to transmit the larger amounts of requested data. This type of configuration is useful for transmitting Internet data across the satellite communication link in response to requests received on communication link 112. As discussed above, use of a satellite communication link eliminates various obstacles that are faced by cable-based or land-based communication systems.

Figure 6:
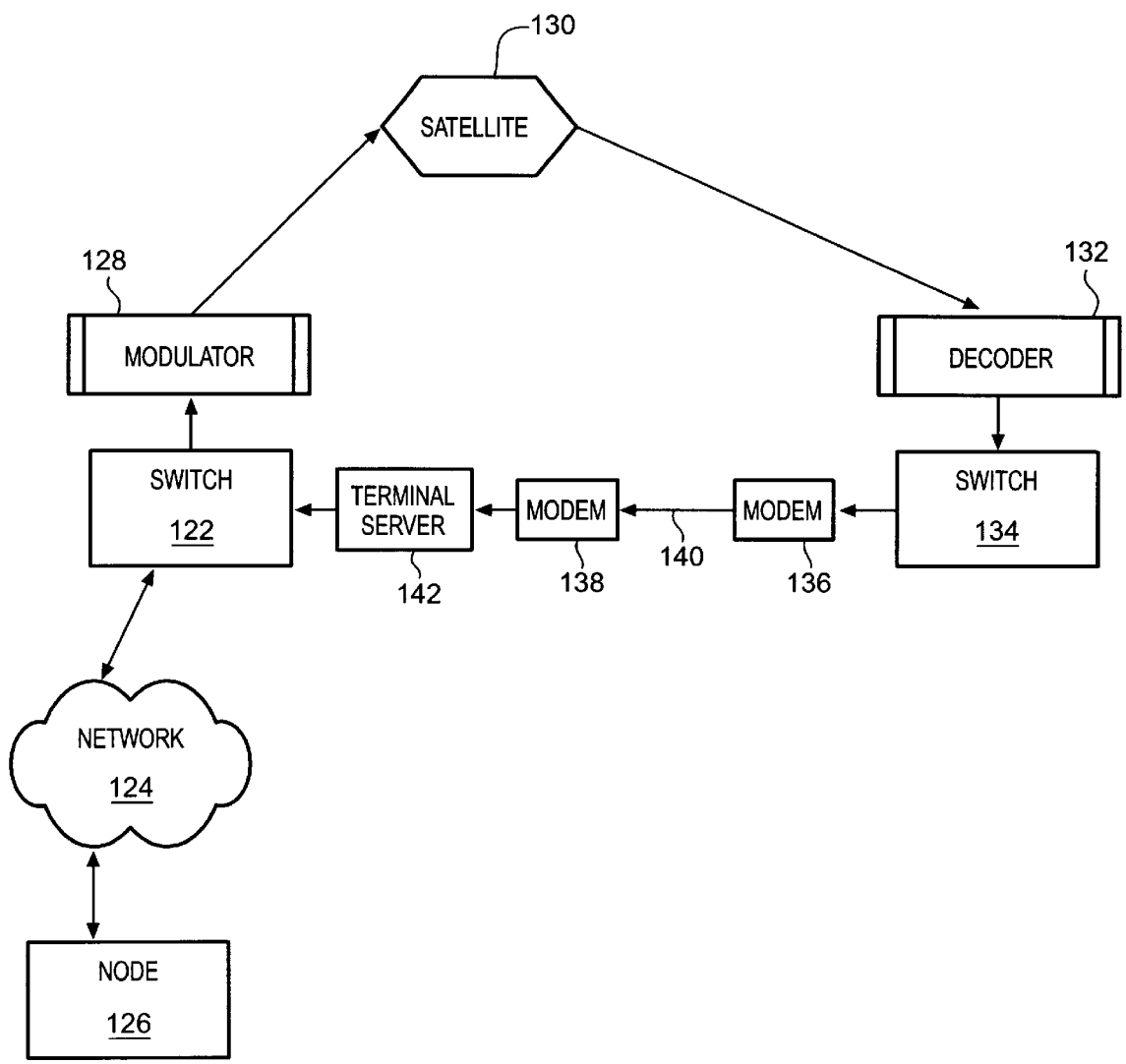

FIG. 6 illustrates another example of a configuration using a satellite communication link. A switch 122 and a node 126 are coupled to communicate with a network 124. A modulator 128 receives data from switch 122, modulates the data, and transmits the modulated signal to a satellite 130. Satellite 130 re-transmits the modulated signal to a decoder 132. Decoder 132 decodes the received signal and transmits a decoded data signal to a node 134.

FIG. 6 illustrates a second communication link between node 134 and switch 122 using a pair of modems 136 and 138, a communication medium 140, and a terminal server 142. Terminal server 142 translates serial data provided by modem 138 into IP data for use by switch 122. In this configuration, node 134 is coupled directly to a decoder 132, instead of being coupled to a network and switch, as illustrated in FIG. 5. Node 134 may be any type of device capable of receiving a data signal from decoder 132 and providing a data signal to modem 136. Although modem 136 is illustrated in FIG. 6 as a separate device, alternate embodiments of the invention may incorporate modem 136 into node 134. Additionally, specific embodiments of the invention may be implemented without terminal server 142 shown in FIG. 6. In these embodiments, modem 138 is coupled directly to switch 122.

The configuration illustrated in FIG. 6 is useful in situations where a node, such as a computer workstation or a network server, can be coupled directly to a satellite receiving system having a decoder. The satellite receiving system may be a home satellite receiver of the type typically used to receive and decode direct-broadcast television signals. A separate satellite channel can be provided for transmitting data from switch 122 to node 134. Thus, node 134 may request data from a device coupled to network 124 by transmitting a request to switch 122 using modems 136 and 138. Switch 122 receives the request and transmits the request to an appropriate node on network 124. The requested data is then transmitted from the appropriate node across network 124 to switch 122. Switch 122 then transmits the requested data to node 134 using the satellite communication link.

The configuration of FIG. 6 is particularly useful in Internet applications where the user of node 134 generates data requests that are small in relation to the size of the requested data. The relatively small data requests can be transmitted quickly, even across a low-bandwidth communication link. In this configuration, the data requests are transmitted using relatively inexpensive modems 136, 138 and communication medium 140 (e.g., a conventional telephone line). Although communication medium 140 may have limited bandwidth, the bandwidth is sufficient to quickly transmit the relatively small data requests to switch 122. The high-bandwidth satellite communication link allows transmission of the requested data from switch 122 to node 134 in a significantly shorter period of time than would be required to transmit the same data over communication medium 140.

If an end-user already has a direct-broadcast satellite receiving system for receiving television signals, the end-user may also receive Internet data using the same satellite receiving system. Thus, the user can receive Internet data across the high-bandwidth satellite communication link without significant additional cost.

Figure 7:
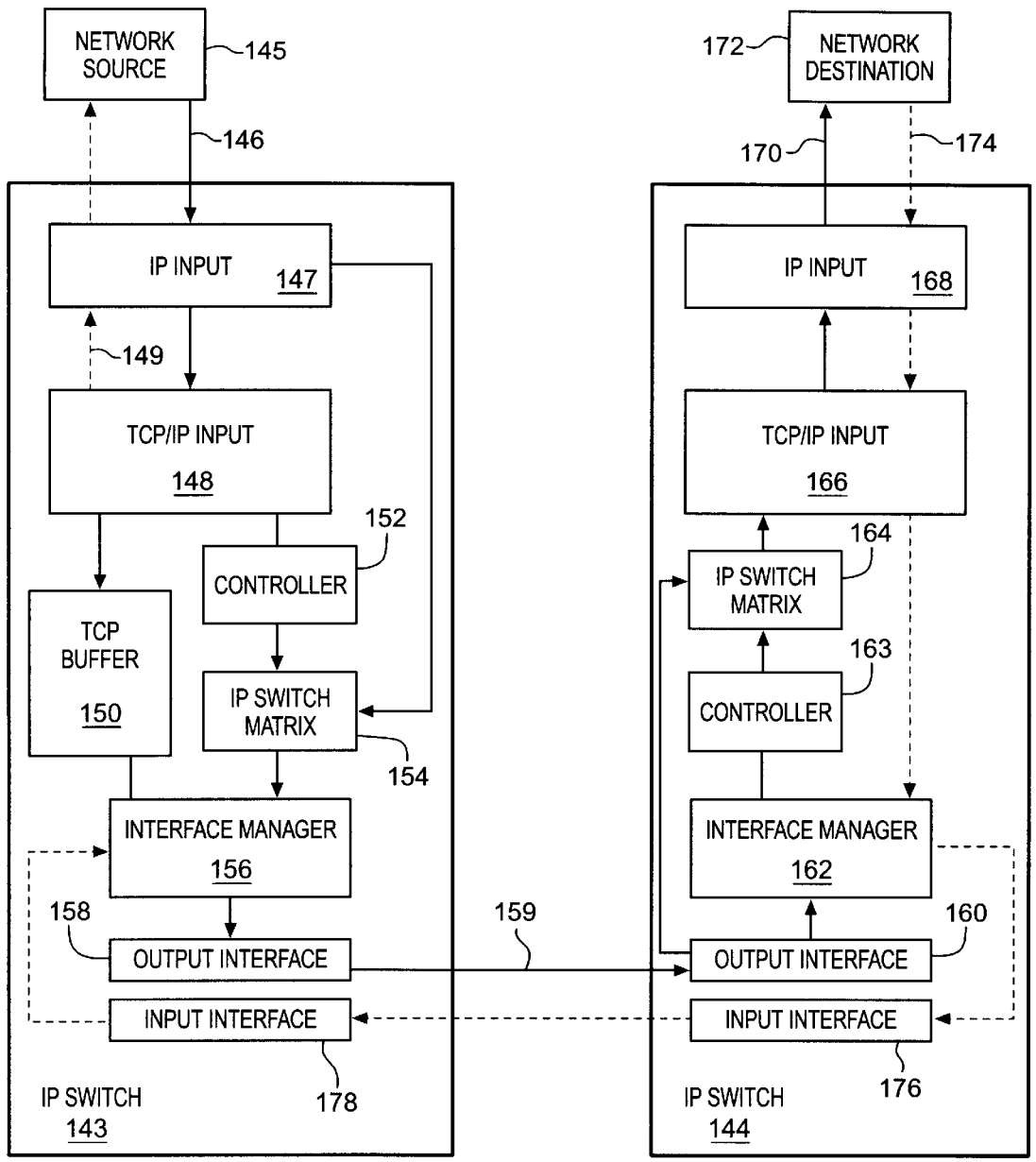
FIG. 7 illustrates a pair of switches capable of communicating with one another across a communication link.

FIG. 7 illustrates a pair of switches 143 and 144 capable of communicating with one another using communication link 159. The particular switches illustrated in FIG. 7 are IP switches, which are used for purposes of explanation. However, the teachings of the present invention may be applied to other types of switches used for data communication. Communication link 159 may be any type of unidirectional or bidirectional link, including a satellite communication link, of the type discussed above with reference to FIGS. 3–6. To simplify the explanation of the operation of switches 143 and 144, only a portion of each switch is shown.

In a particular embodiment of the invention, switches 143 and 144 are similar to switch 30 described above in FIG. 2. Links are shown between various modules in each switch 143, 144. Some links are shown with arrows for purposes of explanation of signal flows through and between switches 143, 144. These arrows do not necessarily identify a unidirectional link. In various embodiments of the invention, any particular link within either switch 143, 144 can be bidirectional.

Switch 143 includes an IP input module 147 that receives an input signal from a network source 145 on communication link 146. IP input module 147 transmits the received data to a TCP/IP input module 148 and to an IP switch matrix 154. TCP/IP input module 148 transmits received data to a TCP buffer 150 where the data is stored until an acknowledgment signal is received from the network destination associated with the data. Additionally, TCP/IP input module 148 generates a "false" acknowledgment signal 149 that is transmitted to network source 145 (through IP input module 147) indicating that the data was received by the network destination. The "false" acknowledgment signal is identical to an actual acknowledgment signal generated by a network destination, but the "false" signal is generated by TCP/IP input module 148. This "false" acknowledgment signal prevents network source 145 from reducing its data transmission rate due to a delayed acknowledgment signal resulting from a high-latency or asymmetrical communication link between switches 143 and 144. Thus, network source 145 believes that the data has been received by the network destination when, in fact, the data has been buffered in TCP buffer 150 and is awaiting transmission to the destination.

A controller 152 controls the operation of IP switch matrix 154, which switches data to the proper interface using interface manager 156. IP switch matrix 154 uses header information contained in the data packet to switch the data packet to the proper interface. Interfaces 158 and 178 in switch 143 are managed by interface manager 156. Output interface 158 is coupled to communication link 159 for communicating with IP switch 144.

An interface manager 162 located in switch 144 is coupled to an input interface 160, which is coupled to communication medium 159. Interface manager 162 provides data received through input interface 160 to an IP switch matrix 164 (using a controller 163). Controller 163 is also capable of communicating information to interface manager 162 (e.g., a message indicating that IP switch matrix 164 is full). Additionally, controller 163 can send control information to interface manager 162 for transmission to switch 143 through output interface 176. The data received by IP switch matrix 164 is communicated to a TCP/IP output module 166, which transmits the data to an IP output module 168. IP output module 168 transmits the data across a communication link 170 to a network destination 172.

In a TCP/IP system, network destination 172 acknowledges receipt of data by returning an acknowledgment signal 174 to switch 144. This acknowledgment signal 174 is illustrated in FIG. 7 as a separate signal having a broken line. Although the acknowledgment signal is illustrated as a separate signal, the actual signal can be transmitted to switch 144 on communication link 170. The acknowledgment signal propagates from IP output module 168 to TCP/IP output module 166, and continues as shown to interface manager 162. The acknowledgment signal is then transmitted to output interface 176, and across communication link 159 to input interface 178 in switch 143. The acknowledgment signal is then transmitted to interface manager 156. When the acknowledgment signal reaches interface manager 156, the data acknowledged by the acknowledgment signal is deleted from TCP buffer 150. Thus, TCP buffer 150 stores a copy of all data transmitted by switch 143 until an acknowledgment signal is received from the network destination.

As discussed above, problems may occur in existing systems having high-bandwidth communication links if sequence numbers (or other data identifiers) repeat such that two or more identical numbers are active at the same time. Embodiments of the invention alleviate these problems eliminating the possibility of identical active sequence numbers. The buffering provided by a switch or other communication device, as discussed above with respect to FIG. 7, and the "held" bandwidth of the communication link, reduce the possibility of identical active sequence numbers. By providing a "false" acknowledgment signal to the data source, the source believes that the data has been received by the destination. Thus, the source can use the sequence number again without actually creating an identical active sequence number.

In a particular embodiment of the invention, larger fields are used for the sequence numbers transmitted between switches. By providing larger fields for the sequence numbers, more numbers can be provided to eliminate the possibility of identical active sequence numbers. Although these enlarged sequence number fields may not be supported by other protocols (such as TCP/IP), if each switch on a particular communication link understands the enlarged sequence number field, then the enlarged field will be transparent to the other devices coupled to the switches.

Referring back to FIG. 3A, the operation of the communication devices shown in FIG. 3A will be described in view of the operation of the system discussed above in FIG. 7. For example, assume that switches 50 and 52 in FIG. 3A operate in a manner similar to switches 143 and 144 in FIG. 7. In this example, communication link 54 is a high-latency communication link used to communicate data between switches 50 and 52. If node 60 has data for transmission to node 68, node 60 transmits the data across network 56 to switch 50. Switch 50 then buffers the received data and returns a "false" acknowledgment signal to node 60, indicating that the data has been received by the destination node (node 68). Therefore, node 60 will continue sending the data stream to switch 50 without a reduction in the data rate because node 60 is unaware that communication link 54 is a high latency link.

Switch 50 then transmits the buffered data to switch 52 while retaining the data in the buffer until the actual acknowledgment is received from node 68. If the acknowledgment is not received within an expected period of time, the data can be retransmitted from the buffer, without requesting that node 60 retransmit the data to switch 50. Thus, node 60 is able to transmit data across high-latency communication link 54 without any reduction in the rate of data transmission to switch 50.

In a particular embodiment, a switch may transmit multiple copies of the same data packet to the same destination. The multiple copies may be spaced apart by a predetermined time period. Transmitting multiple copies of the same data packet increases the likelihood that at least one of the copies will be successfully transmitted to the destination. This is particularly useful in systems having one or more communication links that are susceptible to noise or other distortion that may prevent the successful transmission of a particular data packet. For example, satellite transmission systems may be affected by solar flares. The time period between transmitting copies of the same data packet is variable and can be relative to the duration and frequency of the possible noise. In a particular embodiment, the time period is shorter than the time required for the data packet to propagate to the destination.

Additionally, long communication links can be more susceptible to noise, and therefore benefit from the transmission of multiple copies of the same data packet. Long communication links also require increased time to transmit the data packet and acknowledgment signal, thereby increasing the time that a data source must wait to determine whether a particular packet was successfully transmitted. Transmitting multiple copies of the data packet without waiting for an acknowledgment from the destination is likely to reduce the overall transmission time for a particular data flow.

In another example, communication link 54 in FIG. 3A is an asymmetrical communication link. Switch 50 operates in a similar manner by transmitting a "false" acknowledgment signal to node 60 upon receipt of data from node 60, thereby causing node 60 to continue sending data to switch 50 without reducing the data rate. Switch 50 buffers the data and transmits the data across the asymmetrical communication link to switch 52. When an actual acknowledgment signal is received by switch 50, the data is removed from the buffer. Thus, node 60 is able to transmit data across the asymmetrical communication link without any reduction in the rate of data transmission to switch 50.

In another example, communication link 54 in FIG. 3A is a high-bandwidth communication link. As discussed above, problems may occur in existing systems having high-bandwidth communication links if identical data identifiers (e.g., sequence numbers) are active at the same time. However, since switch 50 transmits a "false" acknowledgment signal to node 60 upon receipt of data from node 60, the problem of identical data identifiers is eliminated. Thus, node 60 is able to transmit data across the high-bandwidth communication link without the possibility that identical data identifiers will be generated.

The configurations shown in FIGS. 3B, 4, 5, and 6 can be used with high-latency communication links, asymmetrical communication links, and high-bandwidth communication links in the manner discussed above with respect to FIGS. 3A and 7.

FIGS. 8–12 illustrate embodiments of procedures performed by various modules within a switch, such as switch 143 or 144 shown in FIG. 7. Although the procedures illustrated in FIGS. 8–12 will be described with reference to IP switches, it will be appreciated that similar procedures may be used with different types of switches.

Figure 8:
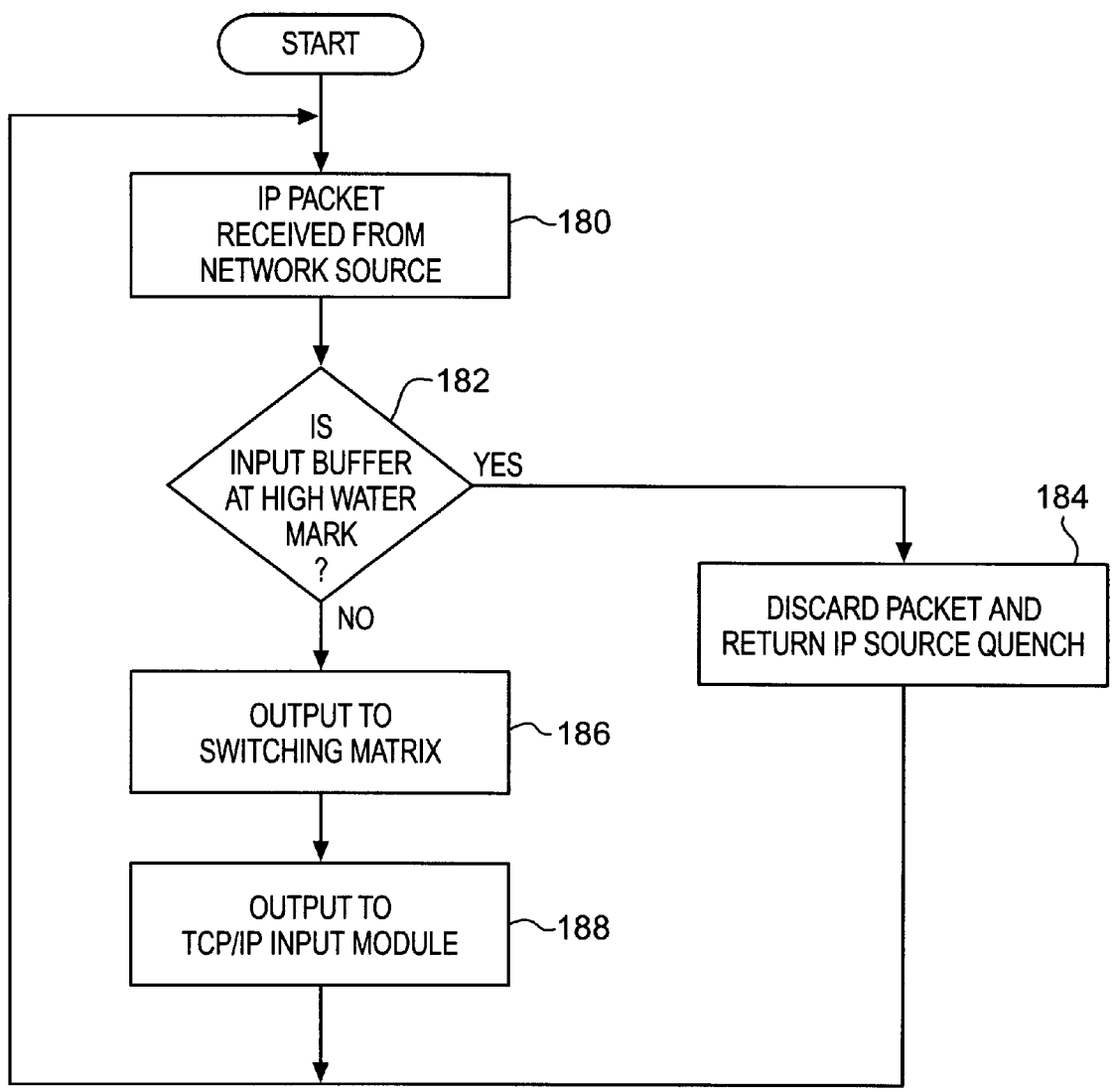
FIG. 8 is a flow diagram illustrating an embodiment of a procedure performed by an IP input module.

FIG. 8 is a flow diagram illustrating an embodiment of a procedure performed by an IP input module, such as module 147 shown in FIG. 7. At step 180, an IP data packet is received from a network source, for example network source 145. Step 182 determines whether the input buffer (e.g., TCP buffer 150) for the switch is at a "high water mark." The high water mark may also be referred to as the "buffer limit" or the "buffer capacity." If the input buffer has reached its high water mark, then the procedure branches to step 184 where the received packet is discarded and an IP source quench is generated. The IP source quench indicates to the network source that the input buffer is full, and instructs the network source to stop its transmission of data to the switch or reduce the rate at which the data is transmitted to the switch. This request for a reduction in the data transmission rate may also be referred to as a request to "back off." After discarding the received packet and generating an IP source quench at step 184, the procedure returns to step 180 to await receipt of the next IP data packet from the network source.

If step 182 of FIG. 8 determines that the input buffer is not at its high water mark, then the procedure continues to step 186 where the received packet is provided to the IP switch matrix. At step 188, the received packet is sent to the TCP/IP input module. The procedure then returns to step 180 to await receipt of the next IP data packet from the network source.

Figure 9:
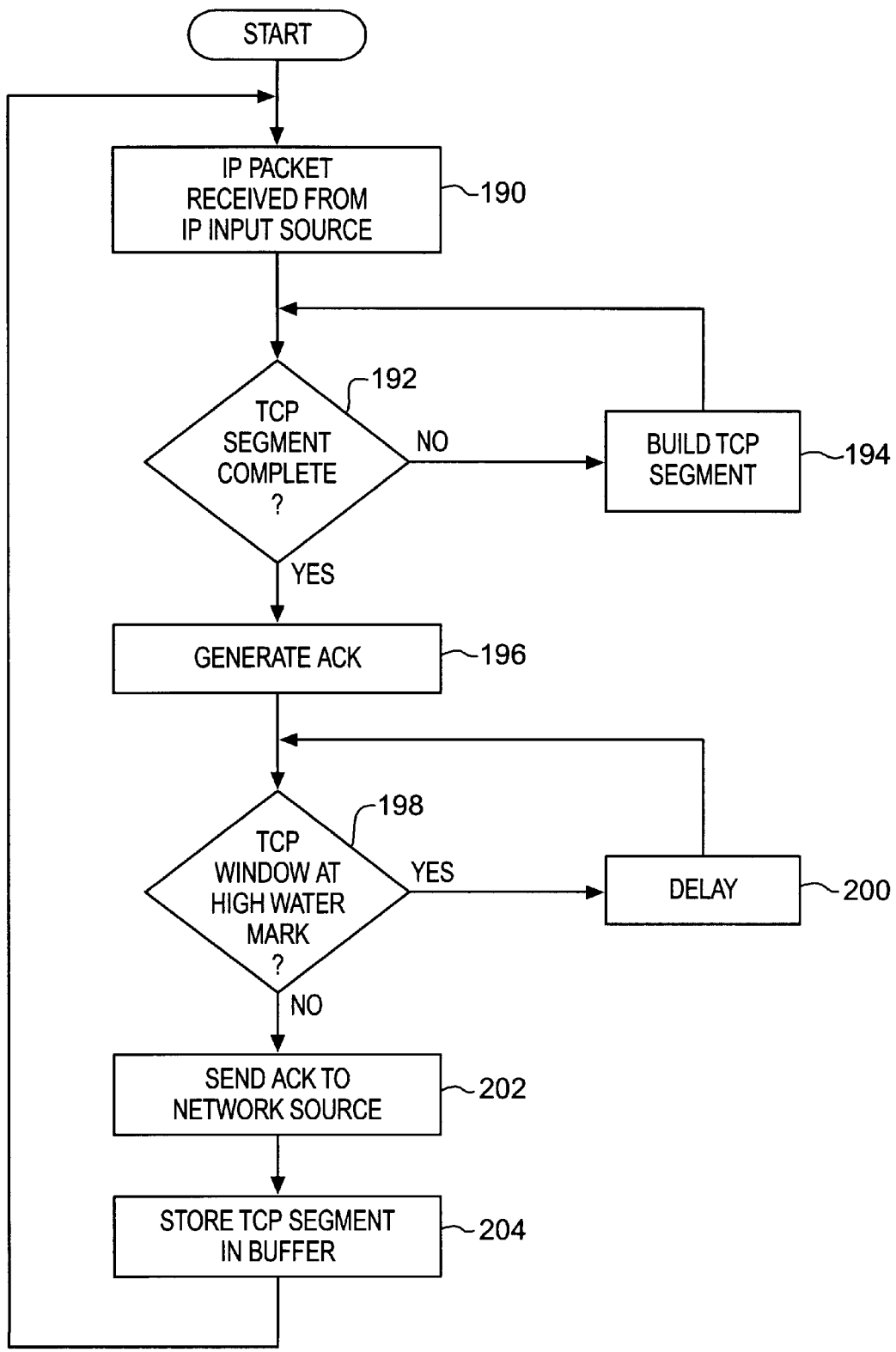
FIG. 9 is a flow diagram illustrating an embodiment of a procedure performed by a TCP/IP input module.

FIG. 9 is a flow diagram illustrating an embodiment of a procedure performed by a TCP/IP input module, such as module 148 shown in FIG. 7. At step 190, an IP data packet is received by the TCP/IP input module from the IP input module. Step 192 determines whether the TCP segment is complete. If the TCP segment is not complete, the procedure branches to step 194 to continue building the TCP segment by adding the IP data packet to the TCP segment. The procedure then returns to step 192 to determine whether the TCP segment is complete. IP data packets are repeatedly added to the TCP segment until the segment is complete.

If the TCP segment is complete at step 192, then the procedure continues to step 196 and generates an acknowledgment signal (ACK signal). At step 198, the procedure determines whether the TCP Window is at the high water mark. The TCP Window high water mark is typically measured as a percentage of the total buffer capacity. If the TCP Window is at the high water mark, then the routine branches to step 200 where processing of the IP data packet is delayed for a predetermined time period. After the delay, step 200 returns to step 198 to repeat the high water mark determination.

If the TCP Window is not at the high water mark, then the procedure continues from step 198 to step 202 where the ACK signal generated in step 196 is transmitted to the network source (i.e., the source of the received IP packet). The ACK signal indicates to the network source that the packet was properly received by the network destination. An ACK signal is transmitted to the network source in step 202 even though the packet may not have been transmitted from the switch or received by the network destination. However, by generating this "false" ACK signal, the network source continues transmitting packets to switch 143 regardless of whether communication link 159 is a high latency link or an asymmetric link. The actual ACK signal received from the network destination is not transmitted to the network source since the "false" ACK signal was previously provided to the network source.

At step 204 of FIG. 9, the TCP segment is stored in a TCP buffer, such as buffer 150 shown in FIG. 7. After storing the TCP segment at step 204, the procedure returns to step 190 to await receipt of the next IP data packet As discussed below, the TCP segment remains in the buffer until the actual ACK signal is received from the network destination, at which time the segment is removed from the buffer.

Figure 10:
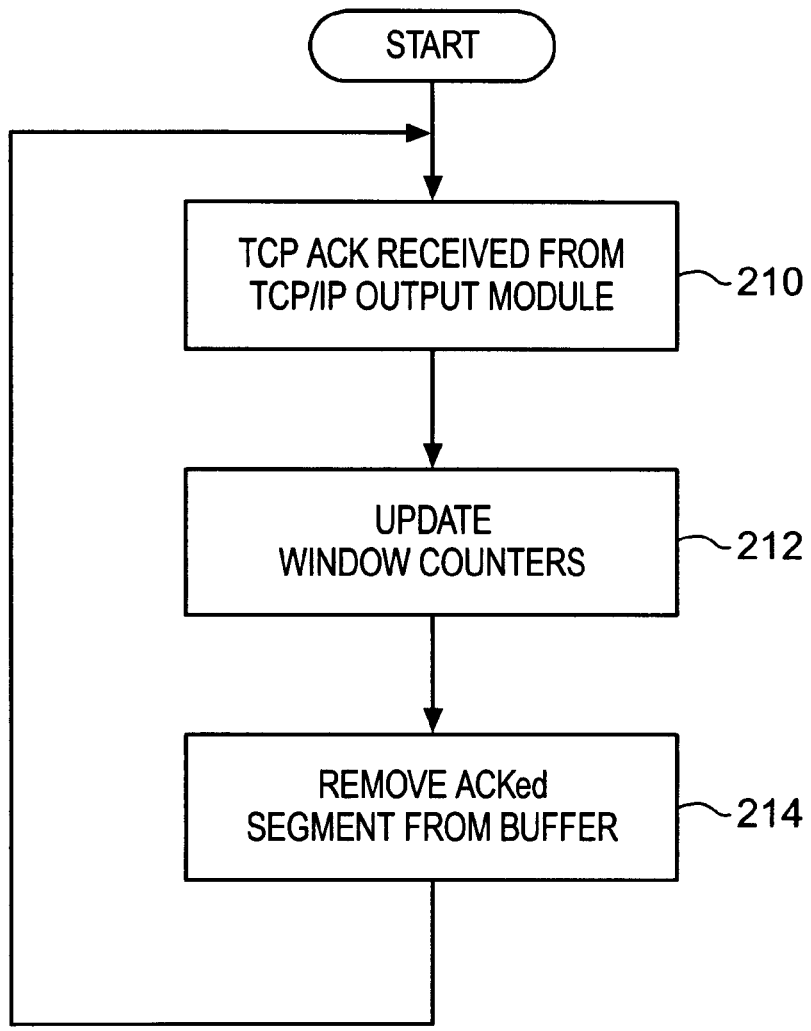
FIG. 10 is a flow diagram illustrating an embodiment of a procedure performed by a TCP buffer.

FIG. 10 is a flow diagram illustrating an embodiment of a procedure performed by a TCP buffer, such as buffer 150 shown in FIG. 7. At step 210, a TCP acknowledgment signal is received from a TCP/IP output module (e.g., module 166 in FIG. 7). This acknowledgment signal is generated by the network destination upon receipt of the TCP segment. The ACK signal is received by the switch and provided to the TCP buffer. At step 212, the TCP buffer updates its window counters to reflect the fact that the acknowledged (ACKed) segment will be removed from the buffer. The window counters maintain the current utilization of the buffer and are used to determine when the buffer approaches or exceeds the high water mark. The window counters are updated each time data is added to or removed from the buffer. After updating the window counters at step 212, the procedure continues to step 214 where the ACKed TCP segment is removed from the buffer, thereby releasing buffer resources for use by other segments. The procedure then returns to step 210 to await receipt of the next ACK signal.

Figure 11:
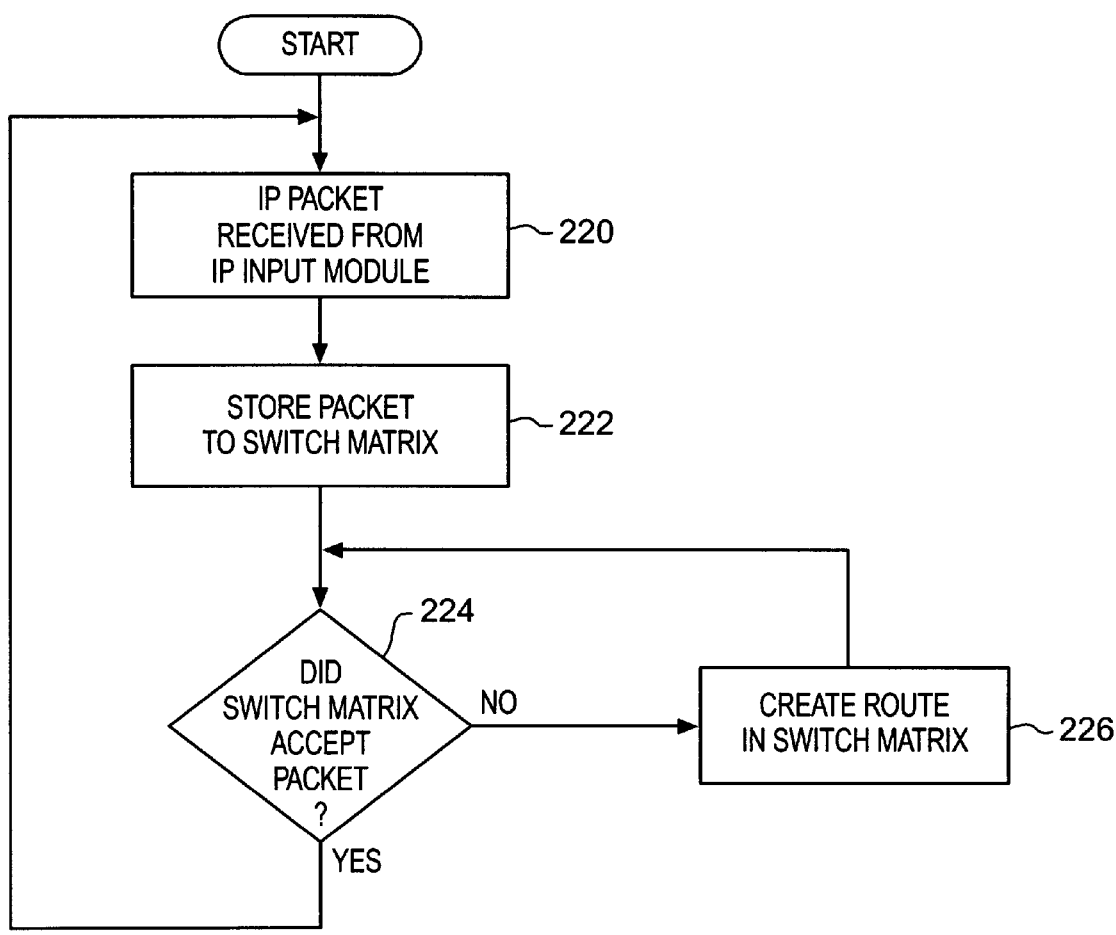
FIG. 11 is a flow diagram illustrating an embodiment of a procedure performed by an IP switch matrix.

FIG. 11 is a flow diagram illustrating an embodiment of a procedure performed by an IP switch matrix, such as switch matrix 154 shown in FIG. 7. At step 220, an IP data packet is received from an IP input module (e.g., module 147 in FIG. 7). The procedure continues to step 222 where the IP packet is stored to the switch matrix. Step 224 determines whether the switch matrix accepted the packet. If the packet is not accepted at step 224, then the procedure branches to step 226 to create a route for the packet in the switch matrix. The procedure then returns to step 224 to determine whether the packet was accepted by the switch matrix. When the packet is accepted by the switch matrix, the procedure branches from step 224 to step 220 to await receipt of the next IP packet from the IP input module.

Figure 12:
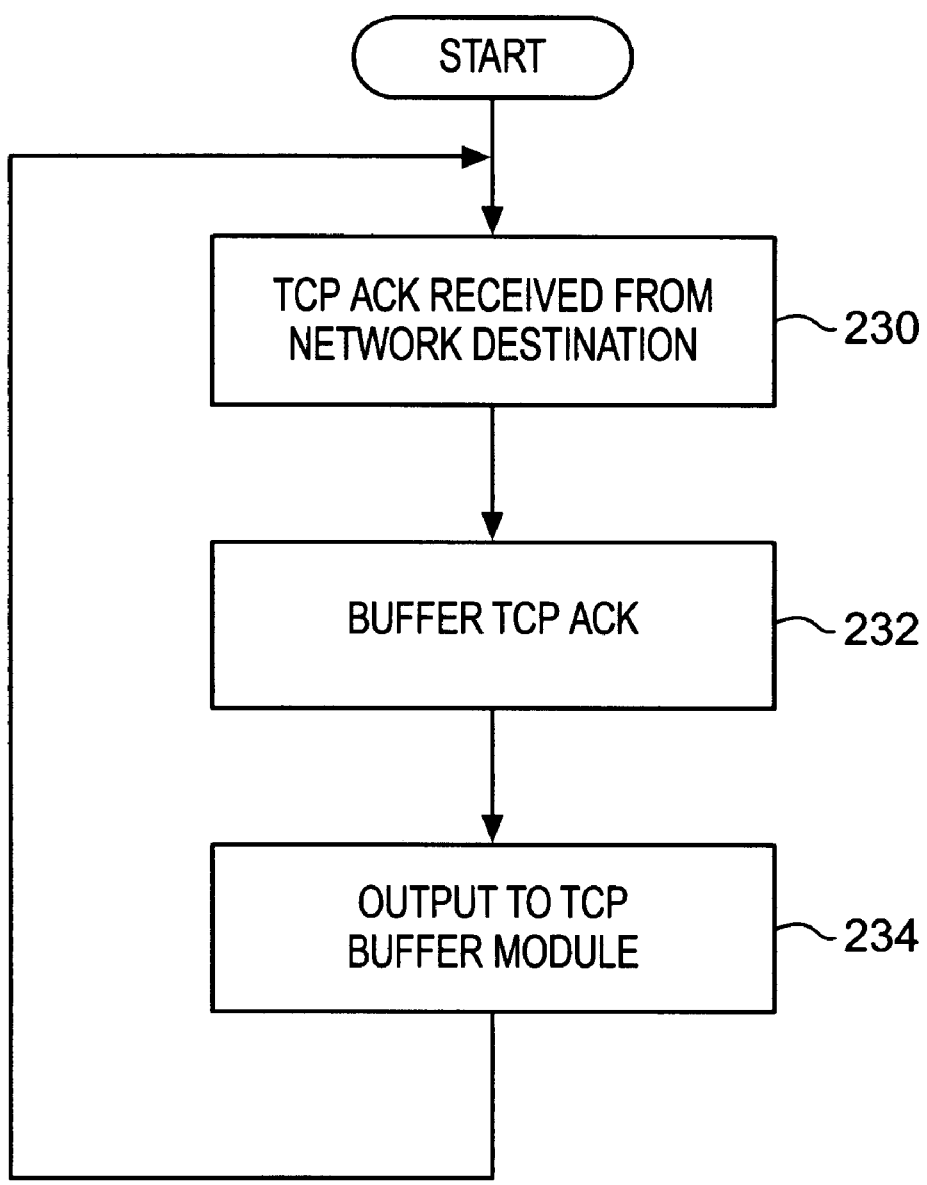
FIG. 12 is a flow diagram illustrating an embodiment of a procedure performed by a TCP/IP output module.

FIG. 12 is a flow diagram illustrating an embodiment of a procedure performed by a TCP/IP output module, such as module 166 shown in FIG. 7. At step 230, a TCP acknowledgment signal is received from a network destination (e.g., network destination 172). The procedure continues from step 230 to step 232, which is an optional step that buffers the acknowledgment signal. The buffering performed at step 232 may be used to group together incoming acknowledgment signals before transmitting the signals to the originating switch. The originating switch is the switch that transmitted the data packet being acknowledged (e.g., switch 143) to the switch receiving the actual acknowledgment. If buffering is not used, the acknowledgment signals are interleaved with other data being transmitted to the originating switch. Step 234 transmits the acknowledgment signal to the TCP buffer in the originating switch (e.g., TCP buffer 150). The procedure illustrated in FIG. 12 is performed for each received acknowledgment signal.

Figure 13:
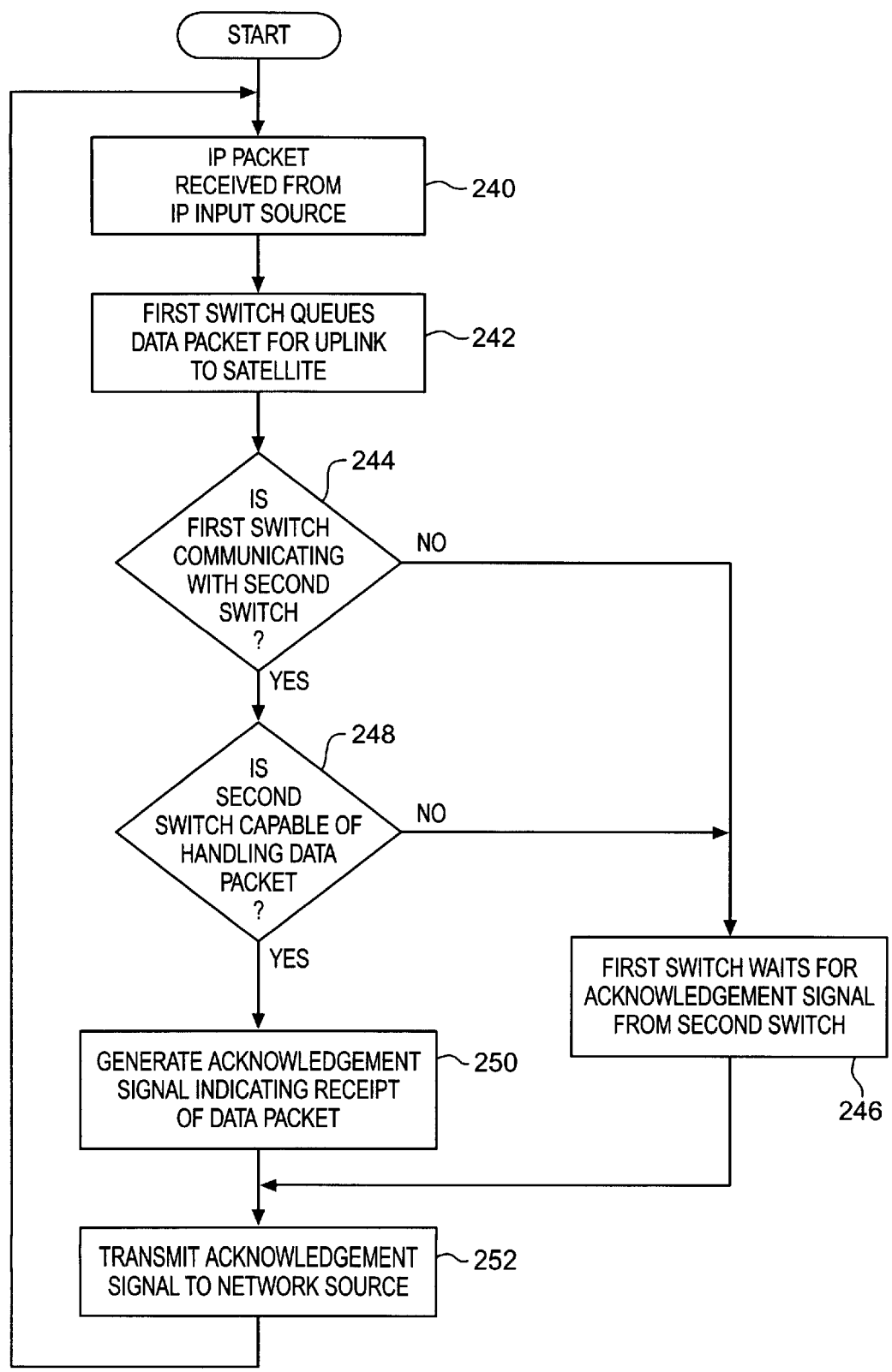
FIG. 13 is a flow diagram illustrating an embodiment of a procedure for transmitting data between a pair of switches using a satellite communication link.

FIG. 13 illustrates the operation of a particular embodiment of the invention utilizing a satellite communication link to transmit data between a pair of switches, such as switches 80 and 82 shown in FIG. 4. At step 240, the first switch (e.g., switch 80 in FIG. 4) receives a data packet from a network source. At step 242, the first switch queues the data packet for uplink (i.e., transmission) to the satellite. At step 244, the first switch determines whether it has already established a communication with the second switch (e.g., switch 82). If the first switch is not communicating with the second switch, then step 244 branches to step 246 where the first switch waits for an acknowledgment signal from the second switch. After receiving the acknowledgment signal, step 246 continues to step 252 where the acknowledgment signal is transmitted from the first switch to the network source.

If the first switch is already communicating with the second switch at step 244, then the procedure continues to step 248 where the first switch determines whether the second switch is capable of handling the received data packet. The first switch is capable of making this determination because of the previously established communication with the second switch. If the second switch is not capable of handling the data packet, then the procedure branches to step 246 where the first switch waits for an acknowledgment signal from the second switch. The procedure then continues to step 252 where the acknowledgment signal is transmitted from the first switch to the network source.

If the second switch is capable of handling the received data packet at step 248, then the procedure continues to step 250 where a "false" acknowledgment signal is generated indicating receipt of the data packet by the network destination. The procedure then continues to step 252 where the acknowledgment signal is transmitted to the network source. Thus, if the first switch is communicating with the second switch and determines that the second switch is capable of handling the received data packet, a "false" acknowledgment signal is generated by the first switch, regardless of whether the data packet received from the network source has been transmitted to the second switch or the network destination. This quick generation of a "false" acknowledgment signal alleviates problems associated with the time delay in transmitting the data and the actual acknowledgment signal across the satellite communication link.

Figure 14:
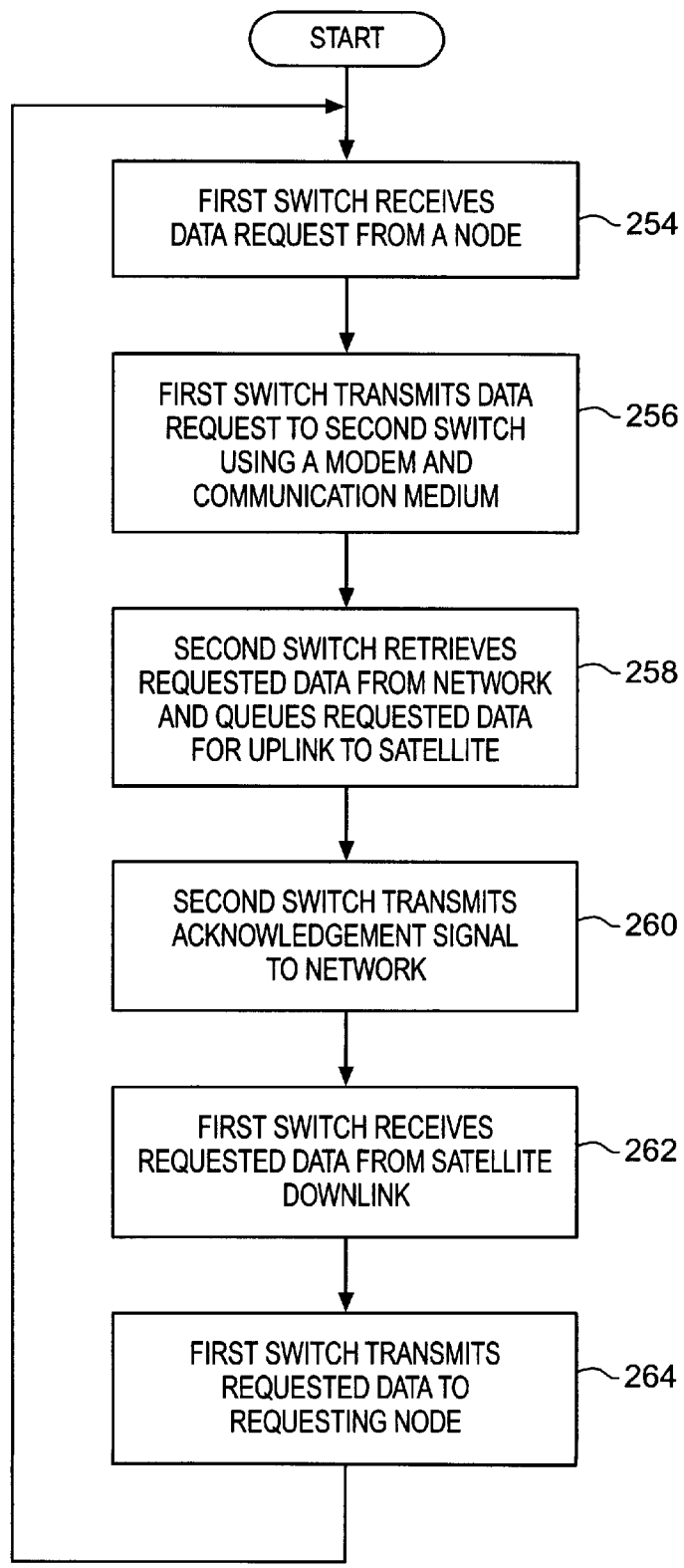
FIG. 14 is a flow diagram illustrating another embodiment of a procedure for transmitting data between a pair of switches using a satellite communication link.

FIG. 14 illustrates the operation of an embodiment of the invention utilizing a unidirectional satellite communication link to transmit data between a pair of switches, such as switches 102 and 104 shown in FIG. 5. At step 254, the first switch (e.g., switch 104 of FIG. 5) receives a data request from a node coupled to the switch through a network or other communication mechanism. At step 256, the first switch transmits the data request to a second switch (e.g., switch 102) using a communication link such as a telephone line. The second switch receives the data request at step 258 and retrieves the requested data through a network or other communication mechanism coupled to the second switch. The second switch queues the requested data for uplink (transmission) to a satellite. At step 260, the second switch transmits an acknowledgment signal to the source of the requested data. At step 262, the first switch receives the requested data from the satellite downlink. Finally, at step 264, the first switch transmits the requested data to the network node requesting the data. The procedure then returns to step 254 to await the next data request.

In a particular embodiment of the invention, additional data, such as IP network data, may be interleaved with another data stream, such as an MPEG or MPEG-2 video data stream. The additional data is interleaved with the data stream prior to transmission of the data stream. The data stream may be transmitted, for example, using one of the communication systems illustrated above in FIGS. 3–6.

However, it will be appreciated that any type of communication link may be used to transmit the data signals discussed below.

Figure 15:
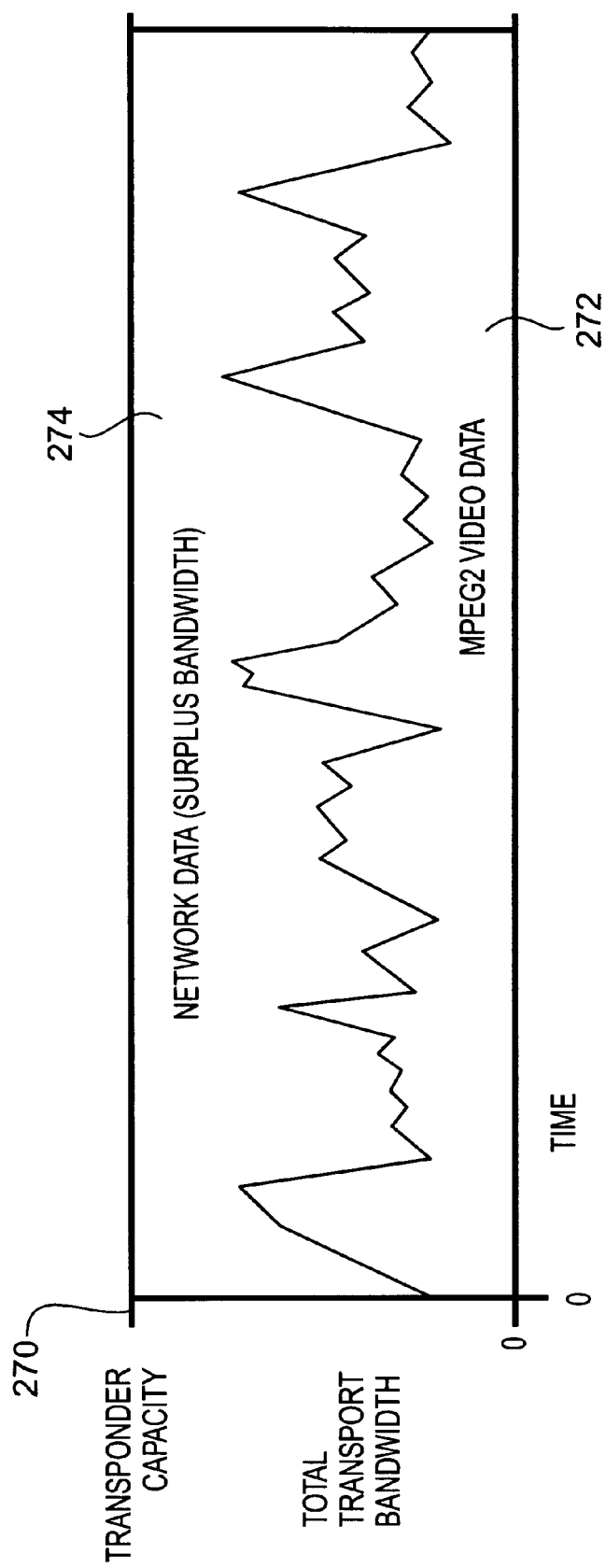
FIG. 15 illustrates an example MPEG video data stream over a period of time.

FIG. 15 illustrates an example MPEG video data stream over a period of time. As shown, the bandwidth of the MPEG video data stream varies in response to the amount of MPEG data being transmitted. The varying bandwidth results from changes in the transmitted image and the ability of the MPEG compression system to compress the video data. As shown in FIG. 15, transponder capacity 270 exceeds the MPEG video bandwidth by varying degrees. An MPEG video data stream 272 is identified as the lower portion of FIG. 15 and the surplus bandwidth, available for transmitting additional data, is identified by reference numeral 274 in the upper portion of FIG. 15. As shown, a significant portion of the total transponder capacity is not utilized by the MPEG video data stream. As discussed below, this unused transponder capacity can be used to transmit additional data, such as network data.

Although a particular example will be illustrated for interleaving network data into an MPEG video data stream, it will be appreciated that additional data may be interleaved into any type of data stream having excess bandwidth, according to the present invention. Thus, the teachings of the present invention are not limited to video data streams, but may be applied to audio data streams, microwave transmission systems, and any other type of data transmission that has excess bandwidth within which to interleave additional data.

FIGS. 16A and 16B illustrate example MPEG video data streams. MPEG video data is arranged into multiple fixed-length data packets. FIG. 16A illustrates seven example MPEG packets in a video data stream. The first packet is approximately 50% utilized, and the remainder of the packet is filled with null data. MPEG video data packets are transmitted on a regular basis, regardless of whether sufficient video data is present to fill the packet. Any unused portion of the packet is filled with null data to ensure that all packets are of uniform length. As shown in FIG. 16A, the second and fifth data packets are filled completely with null data. Thus, a substantial portion of the space available within MPEG data packets is not used to transmit video data, and instead is filled with null data.

Embodiments of the present invention take advantage of the unused space (i.e., surplus bandwidth) in the MPEG data packets. Instead of filling the unused portion of each packet with null data, the present invention interleaves additional data, such as network data, into the MPEG data packet. FIG. 16B illustrates the seven MPEG data packets shown in FIG. 16A, but filled with network data rather than null data. The interleaving of network data into the video data stream does not affect the performance of the MPEG video transmission because the size of the packets transmitted has not changed. The only change between the packets illustrated in FIG. 16A and those of FIG. 16B is the filling of unused packet space with network data rather than null data. Therefore, the amount of data transmitted is unchanged, but useful data is transmitted instead of null data.

As shown in FIG. 16B, a portion of a packet may be filled with additional data (e.g., packets 1, 3, and 7) or an entire packet may be filled with additional data (e.g., packets 2 and 5), depending on the amount of MPEG data stored in the packet. If a particular packet is filled with MPEG data, then no additional data is added to the packet (e.g., packets 4 and 6).

Figure 17:
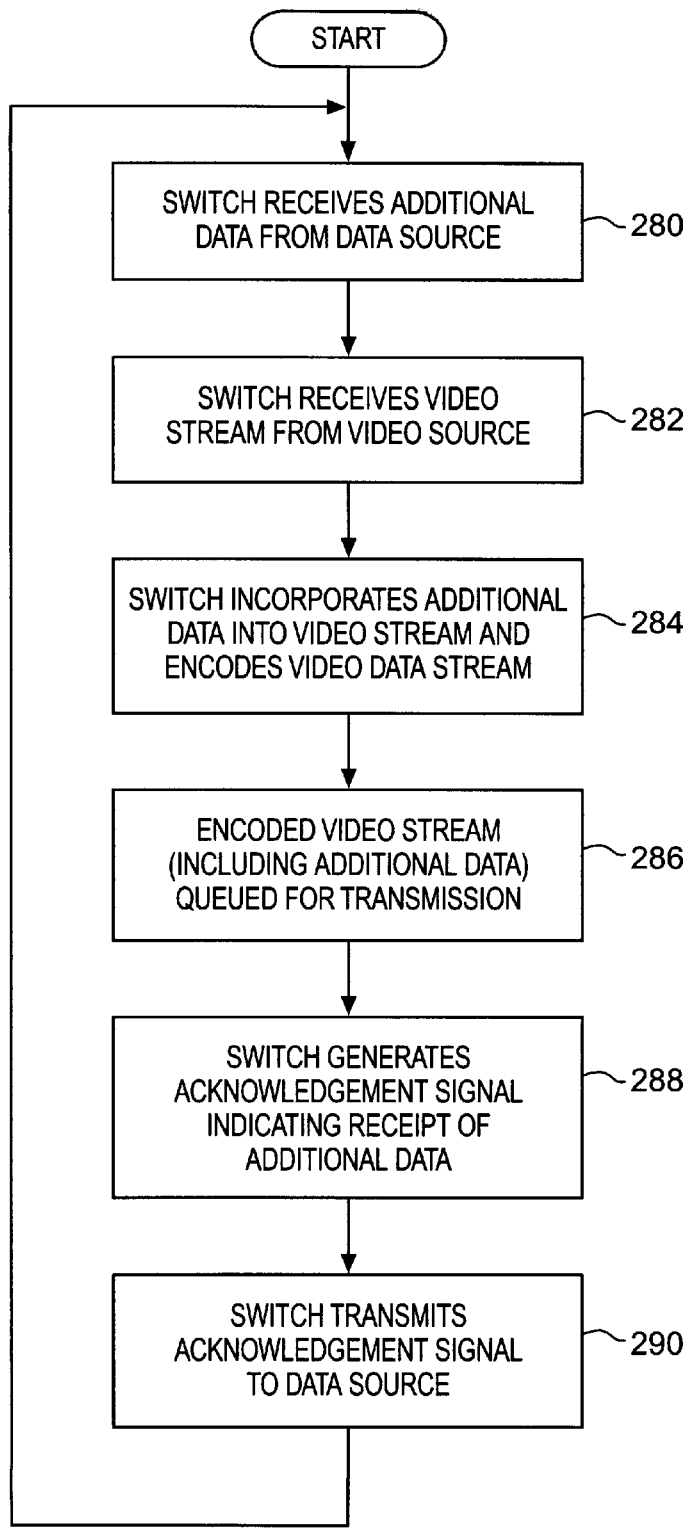
FIG. 17 is a flow diagram illustrating an embodiment of a procedure for interleaving additional data into a video data stream.

FIG. 17 illustrates an embodiment of a procedure for interleaving additional data into a video data stream. At step 280, a switch receives additional data from a data source (e.g., a network data source). At step 282, the switch receives a video data stream from a video source. At step 284, the switch interleaves (or incorporates) the additional data into the unused portions of the data packets in the video stream and encodes the video data stream (e.g., using MPEG or MPEG-2 encoding). The header of each packet includes information indicating the portion of the packet that contains video data. This information is used by the decoder to determine the end of the video data. Step 286 queues the encoded video data stream, including the interleaved additional data, for transmission.

At step 288 of FIG. 17, the switch generates a "false" acknowledgment signal indicating receipt of the additional data by the data destination. At step 290, the switch transmits the "false" acknowledgment signal to the source of the additional data. Thus, the switch generates the "false" acknowledgment signal before the actual data is transmitted to or received by the data destination. This early acknowledgment by the switch eliminates problems associated with transmitting network data over high latency links such as satellite communication links. After the acknowledgment signal is transmitted to the network source at step 290, the procedure returns to step 280 and continues the process of interleaving additional data into the video data stream.

In alternate embodiments of the invention, a "false" acknowledgment signal is not used. Instead, the encoded video data stream, including the additional data, is transmitted or queued for transmission. However, an acknowledgment signal is not transmitted to the source of the additional data until the actual acknowledgment signal is received from the data destination.

Figure 18:
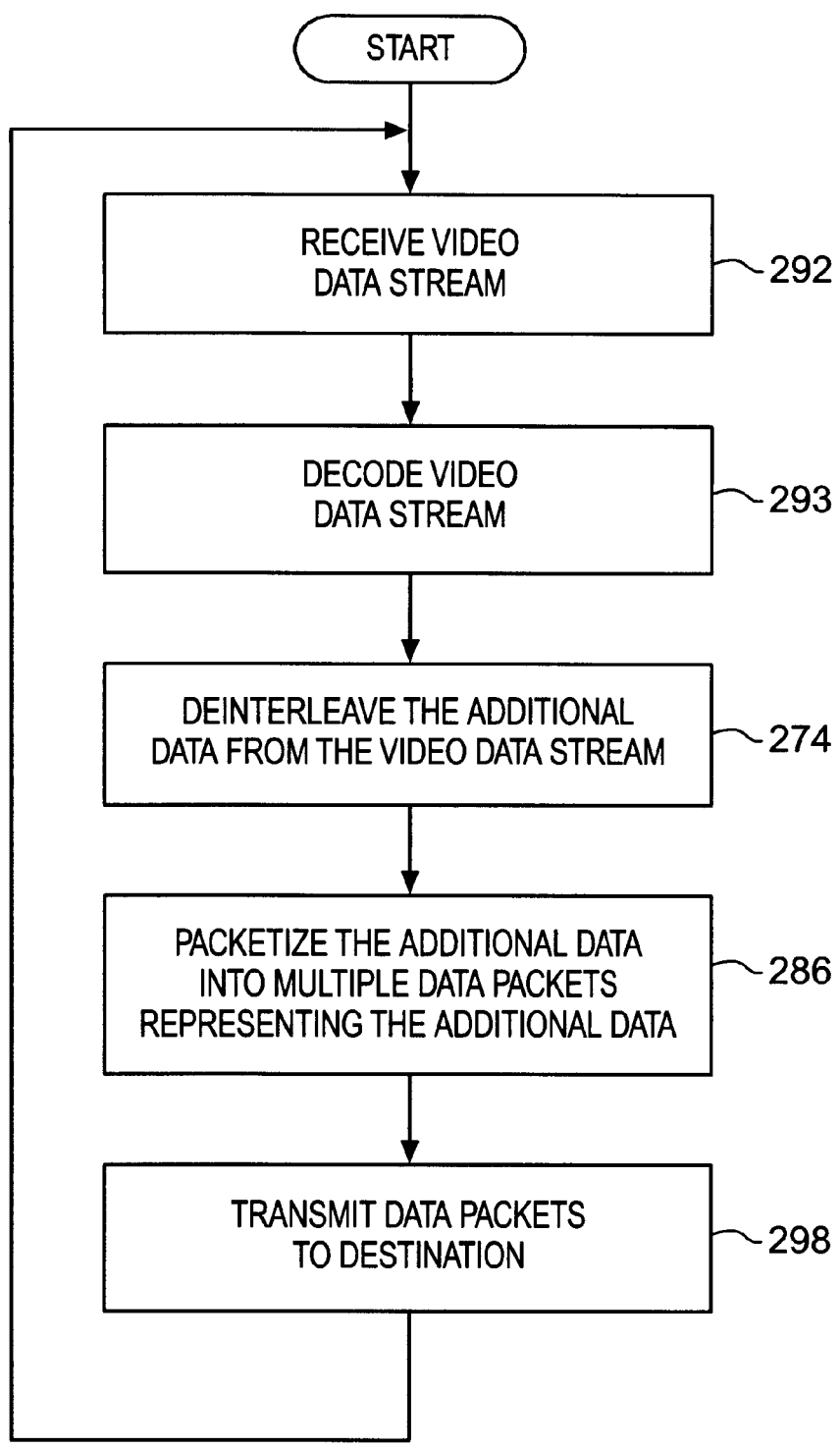
FIG. 18 is a flow diagram illustrating an embodiment of a procedure for retrieving additional data from a video data stream.

FIG. 18 illustrates an embodiment of a procedure for retrieving additional data, such as network data, from a video data stream, such as an MPEG video stream. At step 292, the video data stream is received by a device such as a switching device. The received video data stream is decoded at step 293. For example, if the video data stream is an MPEG data stream, an MPEG decoder is used to decode the received video data stream. The additional data is deinterleaved (or separated) from the video data stream at step 294. The location within the packet at which the video data ends and the additional data begins is indicated by information contained in the header of each packet. The information identifies the point at which the video data ends. Thus, the video data can be properly separated from the additional data, if any, contained in the packet.

Step 296 packetizes the additional data into multiple data packets representing the additional data. At step 298, the data packets are transmitted to the data destination. The procedure then returns to step 292 to continue processing the video data stream. Although not shown in FIG. 18, an acknowledgment signal may be transmitted back to the source of the video data stream when an acknowledgment signal is received from the data destination.

Figure 19:
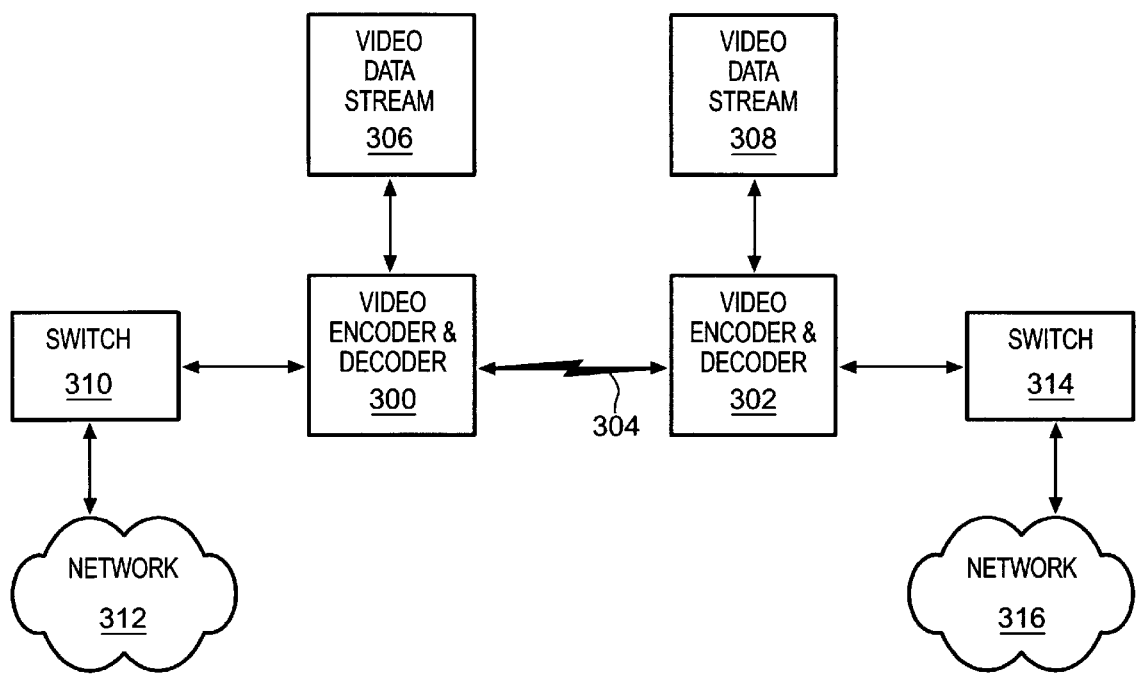
FIG. 19 illustrates an embodiment of a system capable of interleaving and retrieving additional data from a video data stream.

FIG. 19 illustrates an embodiment of a system capable of interleaving and retrieving additional data from a video data stream. In the embodiment of FIG. 19, network data is interleaved with video data and transmitted using an MPEG or MPEG-2 format. A pair of video encoders/decoders 300 and 302 are coupled to opposite ends of a communication link 304. Video encoders/decoders 300 and 302 are capable of encoding data into a particular format, such as an MPEG or MPEG-2 format, and decoding an encoded data stream.

A video data system 306 is coupled to video encoder/decoder 300, and a video data system 308 is coupled to video encoder/decoder 302. Video data systems 306 and 308 may generate or store video signals, or receive and display video signals. Video encoder/decoder 300 is coupled to a switch 310, which is coupled to a network 312. Thus, video encoder/decoder 300 is capable of communicating video data signals with video data system 306 and communicating network data signals with network 312 (through switch 310). Similarly, a switch 314 is coupled to video encoder/decoder 302 and a network 316. Thus, video encoder/decoder 302 can communicate video data signals with video data system 308 and communicate network data signals with network 316 (through switch 314).

In a particular mode of operation, the system of FIG. 19 may transmit network data from network 312 to network 316, and transmit video data from video data system 306 to video data system 308. In this example, video encoder/decoder 300 receives network data via switch 310 and video data from video data system 306. Video encoder/decoder interleaves the network data and the video data and encodes the resulting data stream using an appropriate format. The encoded data is transmitted across communication link 304 to video encoder/decoder 302, which decodes the encoded data and deinterleaves (separates) the network data from the video data. The network data is transmitted to network 316 via switch 314, and the video data is transmitted to video data system 308. In a similar manner, the system of FIG. 19 may transmit network data from network 316 to network 312, and transmit video data from video data system 308 to video data system 306.

Figure 20:
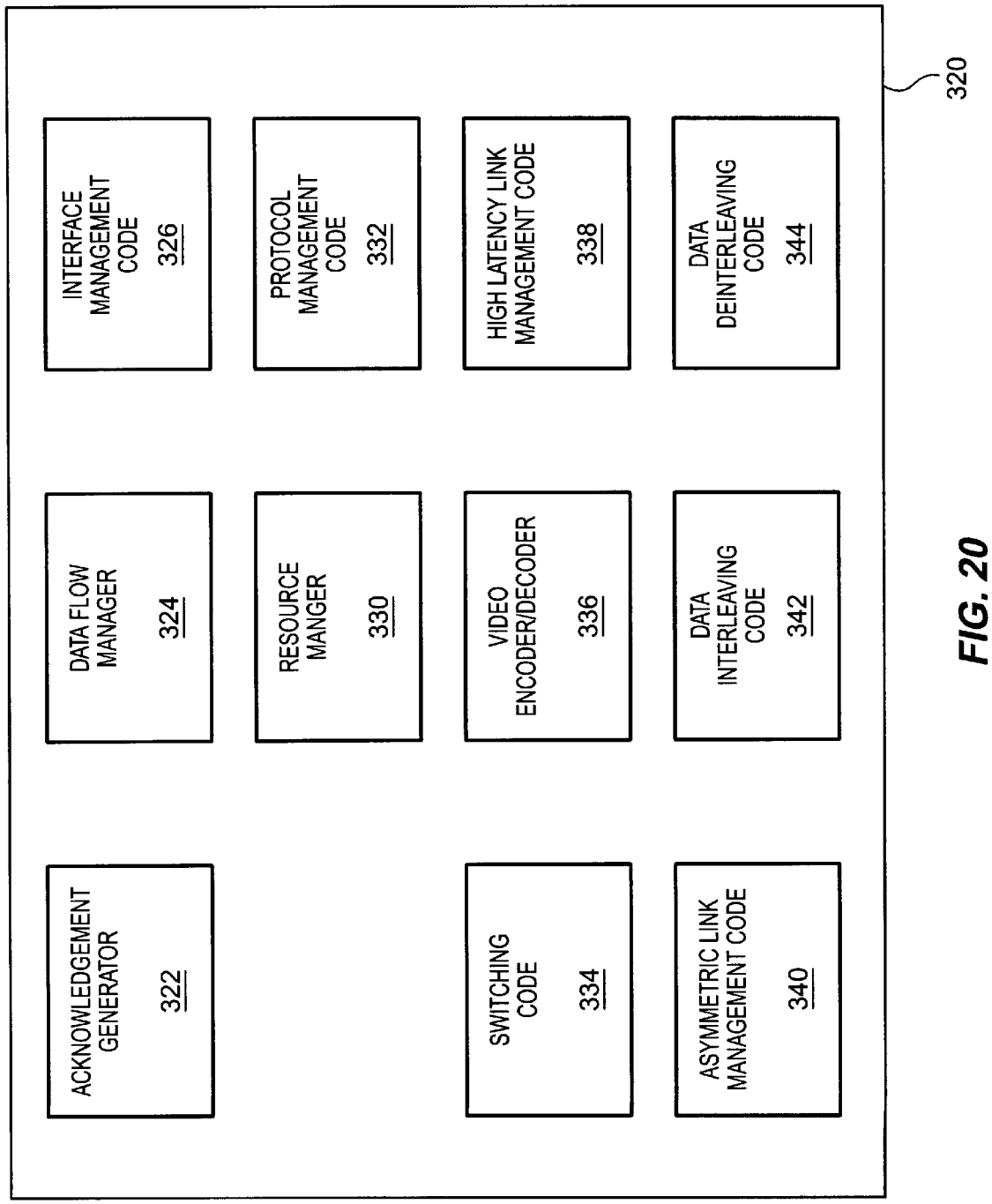
FIG. 20 illustrates an embodiment of a computer-readable medium containing various sets of instructions, code sequences, configuration information, and other data.

FIG. 20 illustrates an embodiment of a computer-readable (or processor-readable) medium containing various sets of instructions, code sequences, configuration information, and other data. Computer-readable medium 320 includes an acknowledgment generator 322 capable of generating acknowledgment signals (such as a "false" acknowledgment signal) for transmission from a switch or other network device. A data flow manager 324 controls the flow of data through a switch or other communication device. Interface management code 326 manages the various interfaces in a switch or other communication device.

A resource manager 330 controls and allocates resources within the switch. Protocol management code 332 manages the various requirements for each supported protocol. Switching code 334 controls the switching matrix within the switch. A video encoder/decoder 336 is provided in embodiments of the invention that interleave additional data into a video data stream. High latency link management code 338 manages the flow of data on high latency communication links. Asymmetric link management code 340 controls the flow of data on asymmetric communication links. Data interleaving code 342 interleaves additional data into a data stream. Data deinterleaving code 344 deinterleaves (or separates) additional data from a data stream. Although illustrated separately, the various instructions, code sequences, and other information shown in FIG. 20 may be combined together into one or more instruction sets, code sequences, and the like.

The embodiment illustrated in FIG. 20 is suitable for use with various types of communication systems and communication devices, including those discussed above. The information stored on medium 320 is used to perform various communication and data processing operations. Computer-readable medium 320 may be any type of magnetic, optical, or electrical storage medium including a diskette, CD-ROM, memory device, or similar storage medium. In particular embodiments of the invention, one or more of the instruction sets, code sequences, and other data shown in FIG. 20 may be omitted from the system. For example, an embodiment that does not interleave additional data into a data stream may not require video encoder/decoder 336, data interleaving code 342, and data deinterleaving code 344.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method for transmitting acknowledgement signals in a data communications system, comprising:

receiving at an intermediate node, a data packet from a source node for transmission across a communication medium to a destination node;

determining, based upon a previous communication with the destination node, whether the destination node is capable of receiving the data packet received by the intermediate node;

generating an acknowledgment signal at the intermediate node if the destination node is capable of receiving the data packet received at the intermediate node; and transmitting the generated acknowledgment signal from the intermediate node to the source node before transmission of the data packet to the destination node.

2. The method of claim 1, wherein generating the acknowledgment signal further comprises monitoring the destination node to determine the capabilities of the destination node.

3. The method of claim 1, wherein the intermediate node is a first switch, the method further comprising transmitting the data packet from the first switch to a second switch, and wherein transmitting the generated acknowledgment signal occurs before transmitting the data packet from the first switch to a second switch begins.

4. The method of claim 3, further comprising buffering the received data packet until an actual acknowledgment signal from the destination node is received at the first switch.

5. The method of claim 3, further comprising deleting the buffered data packet after receiving the actual acknowledgment signal at the first switch.

6. A network switching device, comprising:

a receiver to receive a data packet from a source node for transmission of the data packet across a communication medium coupled with the network switching device and a destination node;

an acknowledgment generator coupled with the receiver to generate an acknowledgment signal indicating receipt of the data packet at the destination node, wherein the acknowledgment generator generates the acknowledgment signal if the destination node is capable of receiving the data packet; and a transmitter coupled with the acknowledgment generator to transmit the acknowledgment signal to the source node before transmission of the data packet to the destination node.

7. The network switching device of claim 6, wherein the source node monitors the destination node to determine the capabilities of the destination node.

8. The network switching device of claim 6, further comprising a second transmitter to transmit the data packet to a second network switching device, wherein the transmitter transmits the acknowledgment signal to the source node before the second transmitter begins to transmit the data packet to the second network switching device.

9. The network switching device of claim 8, further comprising a buffer coupled with the receiver to store the received data packet until an actual acknowledgment signal is received from the destination node.

10. The network switching device of claim 8, wherein the buffered data packet is deleted from the buffer upon receipt of the actual acknowledgment signal from the destination node.

11. A method for generating and transmitting acknowledgement signals in a data communications system, comprising:

receiving at a first network switch a data packet from a source node;

generating an acknowledgment signal at the first network switch, wherein the acknowledgement signal falsely indicates that a destination node received the data packet; and transmitting the generated acknowledgment signal from the first network switch to the source node before beginning transmission of the data packet to a second network switch.

12. The method of claim 11, further comprising:

determining whether a buffer associated with the first network switch has reached a buffer limit; and transmitting a source quench instruction to the source node to reduce the rate at which data is transmitted from the source node to the first network switch if the first network switch has reached the buffer limit.

13. The method of claim 11, further comprising:

transmitting the data packet from the first network switch to the second network switch; and retransmitting the data packet from the first network switch to the second network switch if an actual acknowledgement signal is not received within a predetermined period of time.

14. The method of claim 11, wherein transmitting includes transmitting the generated acknowledgment signal from the first network switch to the source node substantially before beginning transmission of the data packet to a second network switch, the method further including:

buffering the received data packet; and deleting the buffered data packet after receiving an actual acknowledgment signal from the second network switch.

15. The method of claim 11, wherein generating the acknowledgment signal comprises:

determining by communicating with the second network switch, whether the second network switch is capable of receiving the data packet; and transmitting the acknowledgment signal to the second network switch if the second network switch is capable of receiving the data packet.

16. The method of claim 11, wherein generating includes generating the acknowledgment signal if a destination node is capable of receiving the data packet.

17. The method of claim 11, wherein transmitting includes transmitting the acknowledgment signal if a destination node is capable of receiving the data packet.

18. The method of claim 11, wherein generating includes generating the acknowledgment signal if the second network switch is capable of receiving the data packet.

19. The method of claim 11, wherein transmitting includes transmitting the acknowledgment signal if the second network switch is capable of receiving the data packet.

20. The method of claim 19, further comprising the first network switch monitoring the capabilities of the second network switch to handle the data packet.

21. The method of claim 11, further comprising the source node monitoring the capabilities of the destination node to receive the data packet.

22. A processor-readable medium having stored thereon sequences of instructions that when executed cause a processor to:

receive at a first network switch a data packet from a source node;

generate an acknowledgment signal at the first network switch, wherein the acknowledgement signal falsely indicates that a destination node received the data packet; and transmit the generated acknowledgment signal from the first network switch to the source node before beginning transmission of the data packet to a second network switch.

23. The processor-readable medium of claim 22, wherein the instructions further comprise instructions causing the processor to:

transmit the data packet from the first network switch to the second network switch; and retransmit the data packet from the first network switch to the second network switch if an actual acknowledgement signal is not received within a predetermined period of time.

24. The processor-readable medium of claim 22, wherein the instructions to transmit further comprise instructions causing the processor to:

determine by communicating with the second network switch, whether the second network switch is capable of receiving the data packet; and transmit the acknowledgment signal to the second network switch if the second network switch is capable of receiving the data packet.

25. The processor-readable medium of claim 22, wherein the instructions to transmit further comprise instructions causing the processor to:

transmit the acknowledgment signal if a destination node is capable of receiving the data packet.

26. A network switching device, comprising:

a receiver to receive a data packet from a source node via a communication link;

an acknowledgment generator coupled with the receiver to generate an acknowledgment signal that indicates receipt of the data packet at a destination node; and a transmitter coupled with the acknowledgment generator to transmit the acknowledgment signal to the source node before transmission of the data packet to a second network switching device begins.

27. The network switching device of claim 26, further comprising a second transmitter to transmit the data packet to the second network switching device.

28. The network switching device of claim 26, wherein the acknowledgment generator generates the acknowledgment signal if the destination node is capable of receiving the data packet.

29. The network switching device of claim 26, wherein the transmitter transmits the acknowledgment signal if the destination node is capable of receiving the data packet.

30. The network switching device of claim 26, wherein the acknowledgment generator generates the acknowledgment signal if the second network switching device is capable of receiving the data packet.

31. The network switching device of claim 26, wherein the transmitter transmits the acknowledgment signal if the second network switching device is capable of receiving the data packet.

32. The network switching device of claim 26, further including a buffer coupled with the receiver and to store the received data packet until the received data packet is deleted from the buffer after receiving an actual acknowledgment signal from the second network switching device.

33. A network switching device, comprising:

means for receiving a data packet from a source node;

means for generating an acknowledgment signal at a first network switch in response to determining that a second network switching device is capable of handling the received data packet, wherein the acknowledgement signal falsely indicates that a destination node received the data packet; and means for transmitting the generated acknowledgment signal from the first network switch to the source node.

34. The network switching device of claim 33, further comprising means to determine when to generate the acknowledgement signal at the first network switch.

35. The network switching device of claim 33, wherein the means for transmitting is a means for transmitting the generated acknowledgment signal from the first network switch to the source node substantially before beginning transmission of the data packet to a second network switch.

36. A method for generating and transmitting acknowledgement signals in a data communications system, comprising:

receiving at a first network switch a data packet from a source node;

communicating with a second network switch to determine whether the second network switch is capable of receiving the data packet;

generating an acknowledgment signal at the first network switch, wherein the acknowledgement signal falsely indicates that a destination node received the data packet; and transmitting the generated acknowledgment signal from the first network switch to the source node if the second network switch is capable of receiving the data packet.

37. The method of claim 36, wherein communicating occurs after generating.

38. The method of claim 36, wherein transmitting includes transmitting the generated acknowledgment signal from the first network switch to the source node before beginning to transmit the data packet to the second network switch.

* * * * *